(12) United States Patent
Sheard et al.

(10) Patent No.: US 10,489,787 B2
(45) Date of Patent: Nov. 26, 2019

(54) MULTI-LEG TRANSACTION PROCESSING

(71) Applicant: PayPal Inc., San Jose, CA (US)

(72) Inventors: Paul Sheard, San Francisco, CA (US); Kiran Kumar Sridhar, Milpitas, CA (US); Mitendra Mahto, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 894 days.

(21) Appl. No.: 14/985,139

(22) Filed: Dec. 30, 2015

(65) Prior Publication Data
US 2017/0193512 A1 Jul. 6, 2017

(51) Int. Cl.
G06Q 20/40 (2012.01)
G06Q 20/24 (2012.01)
G06Q 20/34 (2012.01)

(52) U.S. Cl.
CPC ......... *G06Q 20/4016* (2013.01); *G06Q 20/24* (2013.01); *G06Q 20/342* (2013.01)

(58) Field of Classification Search
None
See application file for complete search history.

(56) References Cited

U.S. PATENT DOCUMENTS

| | | | | |
|---|---|---|---|---|
| 2007/0143204 A1* | 6/2007 | Claus | ........... | G06Q 20/10 705/37 |
| 2011/0078686 A1* | 3/2011 | Iyengar | ........... | G06F 9/546 718/101 |
| 2011/0145124 A1* | 6/2011 | Rooney | ........... | G06Q 40/04 705/37 |

OTHER PUBLICATIONS

"FIX Order Routing Protocol" International Securities Exchange, Inc,. Print Date: Jul. 10, 2009.*

* cited by examiner

*Primary Examiner* — Olabode Akintola
(74) *Attorney, Agent, or Firm* — Maschoff Brennan

(57) ABSTRACT

An embodiment includes a method of multi-leg transaction processing. The method includes receiving from a merchant server, a designation of two or more sub-transactions of a pending multi-leg transaction as a coupled group. The execution of any of the two or more sub-transactions in the coupled group is dependent on prior authorization of each of the two or more sub-transactions. The method includes receiving transaction input used to indicate conditional execution of the multi-leg transaction. Prior to execution of the multi-leg transaction and in substantially real time, the method includes determining whether each of the two or more sub-transactions in the coupled group is authorized. In response to any of the two or more sub-transactions being unauthorized, the method includes preventing execution of the multi-leg transaction. In response to authorization of each of the two or more sub-transactions, the method includes executing the multi-leg transaction non-sequentially.

20 Claims, 31 Drawing Sheets

US 10,489,787 B2

MULTI-LEG TRANSACTION PROCESSING

FIELD

The embodiments discussed herein are related to multi-leg transaction processing.

BACKGROUND

Multi-leg transactions may include two or more sub-transactions that may be related. For example, products or services that are associated with a single event may be purchased in a single multi-leg transaction or purchase of a product may include incidental sub-transactions such as customs fees.

The two or more sub-transactions may be authorized and executed individually and sequentially. For instance, a first sub-transaction of a multi-leg transaction may be authorized and executed. However, a second sub-transaction of the multi-leg transaction may not be authorized and thus, not executed. Because a relationship between the first sub-transaction and the second sub-transaction, authorization failure of the second sub-transaction may frustrate or make impractical the first sub-transaction. In some instances, the first sub-transaction may be refunded or cancelled after the fact. In others, the buyer may be simply left to find a replacement for the second sub-transaction. Thus, inability to authorize the second sub-transaction imposed inefficiencies to financial entities implementing the transaction and may cause inconvenience to vendors and/or buyers involved in the multi-leg transaction.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of multi-leg transaction processing includes receiving from a merchant server, a designation of two or more sub-transactions of a pending multi-leg transaction as a coupled group. The execution of any of the two or more sub-transactions in the coupled group is dependent on prior authorization of each of the two or more sub-transactions. The method includes receiving transaction input used to indicate conditional execution of the multi-leg transaction. Prior to execution of the multi-leg transaction and in substantially real time, the method includes determining whether each of the two or more sub-transactions in the coupled group is authorized. In response to any of the two or more sub-transactions being unauthorized, the method includes preventing execution of the multi-leg transaction. In response to authorization of each of the two or more sub-transactions, the method includes executing the multi-leg transaction non-sequentially.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Multi-leg transactions include two or more sub-transactions that may be related. Individually and sequentially processing multi-leg transactions may introduce inefficiencies and inconvenience to buyer, vendors, merchants, and financial entities involved in the multi-leg transaction.

For instance, in a system that sequentially processes a multi-leg transaction, a first sub-transaction of a multi-leg transaction may be authorized and executed. Additionally, confirmation messages may be sent to the vendor and a buyer of the first sub-transaction and execution of the first sub-transaction may be reflected in financial accounts of the buyer and/or the vendor. However, a second sub-transaction of the multi-leg transaction may not be authorized and thus, not executed. For instance, a purchase in the second sub-transaction may exceed a credit limit or may be conducted by an untrustworthy party. Because a relationship between the first sub-transaction and the second sub-transaction, authorization failure of the second sub-transaction may frustrate or make impractical the first sub-transaction. Thus, first sub-transaction may be refunded or cancelled or the buyer may be left to find a replacement for the second sub-transaction. In systems in which the first sub-transaction is refunded or cancelled, there may be refund transaction reflected in the financial accounts. Additionally, multiple communications may be sent to the buyer, the vendor, a merchant, or some combination thereof explaining the failure of the authorization of the second transaction. In systems that do not cancel the first sub-transaction, the buyer and/or the vendor may be imposed upon to correct the issue, which may cause inconvenience and frustration of the buyer.

Accordingly, some embodiments described in this disclosure designate two or more sub-transactions of a multi-leg transaction as a coupled group. Instead of sequentially and individually processing the sub-transactions, each of the sub-transactions is authorized, and then all of the sub-transactions are executed. Additionally, if any of the sub-transactions of the coupled group fail to be authorized, all of the sub-transactions in the coupled group are prevented from being executed. Accordingly, processing the multi-leg transaction, or some portion thereof, a coupled group provides a solution to inefficiencies introduced by sequentially and individually processing sub-transactions. For example, a buyer and/or a vendor may not receive inaccurate communications regarding execution of the sub-transactions. Additionally, financial entities may avoid refund transactions.

These and other embodiments are describe with reference to appended figures in which items with like designation numbers indicate like structure, unless otherwise indicated.

Figure 1:
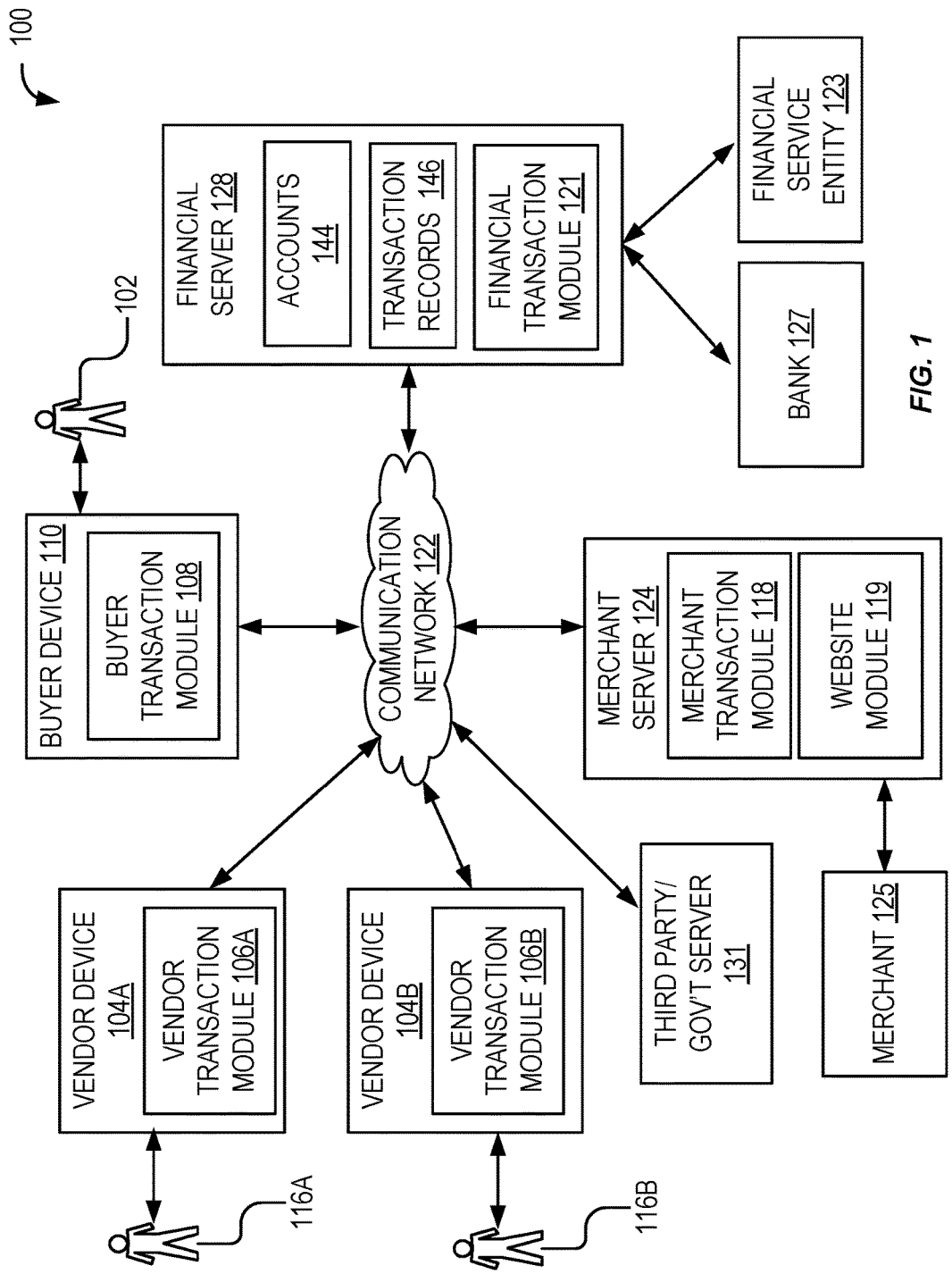
FIG. 1 illustrates an example operating environment in which a multi-leg transactions may be processed.

Turning to the figures, FIG. 1 illustrates an example operating environment 100 in which multi-leg transactions processing may be implemented, according to at least one embodiment. In the operating environment 100, a merchant 125 provides a website via a website module 119 via which a buyer 102 may interface with vendors 116A and 116B (generally, vendor 116 or vendors 116). For example, one or both of the vendors 116 may use a vender device 104A or 104B (generally, vendor device 104 or vendor devices 104) to list one or more products for sale on the website provided by the merchant 125. The buyer 102 may operate a buyer device 110 to interface with the website to view and/or purchase the products listed by the vendors 116.

In some circumstances, a transactions implemented in the operating environment 100 may be a multi-leg transaction. The multi-leg transaction includes two or more sub-transaction. The sub-transactions may include any type of transaction that included in a multi-leg transaction. Use of the "sub" prefix is used in this disclosure to indicate inclusion in the multi-leg transaction.

The sub-transactions of the multi-leg transaction may be related. In a first type of multi-leg transaction, the sub-transactions may be for related products. An example of this first type of multi-leg transaction may include the buyer 102 renting a hotel room for a vacation, a rental car for the vacation, and purchasing an airline ticket for the vacation. The vendor 116 of the hotel room may be a hotel company, the vendor 116 of the rental car may be a rental car company, and the vendor 116 of the airline ticket may be an airline. In this example, the multi-leg transaction may include a first sub-transaction that is the rental of the hotel room, a second sub-transaction that is the rental of the rental care, and a third sub-transaction that is the purchase of the airline ticket.

In the first type of multi-leg transaction, multiple vendors 116 may be involved as described immediately above. Additionally, in the first type of multi-leg transaction, a single vendor 116A or 116B may be involved. For instance, a first vendor 116A may sell multiple, related products to the buyer 102. An example of the first type of the multi-leg transaction including the single vendor 116A or 116B may include the buyer 102 purchasing multiple airline tickets from the airline on the same flight. Furthermore, in the first type of multi-leg transaction, the buyer 102 may purchase one or more of the products from the merchant 125.

In a second type of multi-leg transaction, the sub-transactions may be for a purchase of a product from one of the vendors 116 or the merchant 125 and for an incidental transaction related to the purchase of the product. An example of the second type of multi-leg transaction may be for a purchase of a product on an electronic marketplace such as EBAY® or AMAZON®. The product may have an incidental fee due to a third party 135 or a governmental entity 133 such as PITNEY BOWES® or a customs office of jurisdiction. The incidental fee may include a customs fee, a shipping fee, a handling fee, etc. In this example, the multi-leg transaction may include a first sub-transaction of the purchase of the product and a second sub-transaction of the incidental fee.

Other types of multi-leg transactions may include chain payments, coupled payments, split payments, partner fees, other types of transactions that include two or more sub-transactions, other transactions involving multiple payment units, or some combination thereof. A chain payment may include a first transfer to a first vendor 116A as a primary receiver then a second transfer of a second amount from the first vendor 116A to one or more secondary receivers (e.g., a second vendor 116B). A coupled payment may include a transfer of to the first vendor 116A in a first sub-transaction that is coupled to another transfer to the second vendor 116B in a second sub-transaction that occurs at the same time. For example, a payment by the buyer 102 to participate in a marathon with an added $5 donation to a charity that is coupled to a payment of a marathon participation fee. A split payment may be separation of a single payment to two receivers (e.g., the vendors 116).

The multi-leg transactions may include the merchant 125. For example, the multi-leg transaction may include a transfer from the buyer 102 to the vendors 116 using a merchant server 124 as an intermediary and using a financial server 128 that transfer funds between the buyer 102, the vendors 116, and the merchant 125. The multi-leg transaction may omit the merchant 125. For example, the multi-leg transaction may include a transfer from the buyer 102 to the vendors 116 using the financial server 128 to transfer funds between the buyer 102 and the vendors 116.

In the operating environment 100 of FIG. 1, the two or more sub-transactions of the multi-leg transaction may be designated as a coupled group. For example, the merchant 125 using a merchant server 124 may designate the sub-transactions as the coupled group. After the sub-transactions are designated as a coupled group, each of the sub-transactions may be authorized prior to the multi-leg transaction being executed. Furthermore, failure of one of the sub-transactions to be authorized, the multi-leg transaction e.g., the sub-transactions included therein, is prevented from being executed.

Processing the multi-leg transactions may include authorizing the sub-transactions individually, but delaying an ultimate execution of the multi-leg transaction until all of the sub-transactions are authorized. This processing may ensure an "all or nothing semantic." Accordingly, a first of the sub-transactions may be authorized, but a later sub-transaction may fail to be authorized. The failure of the later sub-transaction may void or reverse any steps taken regarding the first of the sub-transactions and the multi-leg transaction may be prevented from being executed. Accordingly, the buyer 102 may not see any activity in their account regarding the multi-leg transaction. For example, in a coupled payment that includes two sub-transactions, a first authorization of a first of the two sub-transaction may succeed and a second authorization of a second of the two sub-transactions may fail. In response, a failure may be returned to the merchant 125 and/or the buyer 102. In addition, the first authorization may automatically void. A first payment related to the first of the two sub-transactions may not show up in an account or account statement of the buyer 102.

In some embodiments, authorization of the sub-transactions may occur in real time and prior to a transaction confirmation. For example, the buyer 102 may assemble in a checkout screen or an equivalent electrical transaction interface (e.g., shopping cart or a checkout page) products to be purchased. The merchant server 124 may designate the products as a coupled group. The buyer 102 may attempt to execute the transaction (e.g., select a "confirm and pay" icon on the checkout page on the buyer device 110). Prior to a confirmation page being displayed on the buyer device 110, it may be determined whether the sub-transactions in the coupled group are authorized. In response to the sub-transactions being authorized, the confirmation page may be displayed. In response to the sub-transactions not being authorized, an error page may be displayed.

The illustrated operating environment 100 of FIG. 1 includes the vendor devices 104, the buyer device 110, a financial server 128, the merchant server 124, a third party or government server (in FIG. 1, third party/gov't server) 131, and a communication network 122 (collectively, environment components). The buyer device 110 may be associated with the buyer 102, the vendor devices 104 may be associated with vendors 116, the financial server 128 may be associated with a bank 127 and/or a financial services entity 123, and the merchant server 124 may be associated with the merchant 125. The associations mentioned immediately above indicate a relationship of ownership, direction, and/or regular use. Accordingly, signals and messages communicated from a device (e.g., 104, 110, 128, and 124) may be attributed to an associated entity (e.g., 116, 125, 121, 123, and 102). Similarly, signals and messages communicated to the device (e.g., 104, 110, 128, and 124) may be intended for the associated entity (e.g., 116, 125, 121, 123, and 102).

The environment components may communicate information and data via the communication network 122. In particular, the environment components may communicate information and data related to multi-leg transaction processing. For example, the buyer device 110, the vendor device 104, the merchant server 124, the financial server 128 or some combination thereof, may be configured to perform operations related to the multi-leg transaction processing. Each of the environment components is briefly described in the following paragraphs.

The communication network 122 may include a wired network, a wireless network, or any combination thereof. The communication network 122 may include any suitable configuration or configurations including a star configuration, token ring configuration, or other configurations. The communication network 122 may include a local area network (LAN), a wide area network (WAN) (e.g., the Internet), and/or other interconnected data paths across which multiple devices may communicate. In some embodiments, the communication network 122 may include a peer-to-peer network. The communication network 122 may also be coupled to or include portions of a telecommunications network that may enable communication of data in a variety of different communication protocols. In some embodiments, the communication network 122 includes BLUETOOTH® communication networks and/or cellular communication networks for sending and receiving data including via short messaging service (SMS), multimedia messaging service (MMS), hypertext transfer protocol (HTTP), direct data connection, wireless application protocol (WAP), e-mail, and the like.

The vendors 116 and the buyer 102 may include any entity such as an individual or company. In some transactions, the vendors 116 may not sell a product. For example, the vendors 116 may be organizations that receive or solicit donations or contributions from the buyer 102.

The vendor devices 104 and the buyer device 110 may include computing devices that may include a processor, memory, and network communication capabilities. The vendor devices 104 and the buyer device 110 may be configured for communication with one or more other environment components via the communication network 122. Some examples of the vendor devices 104 and the buyer device 110 include a laptop computer, a desktop computer, a tablet computer, a mobile telephone, a smartphone, a personal digital assistant ("PDA"), a mobile e-mail device, a portable game player, a portable music player, smart wearable technology, or any other applicable electronic device capable of accessing the communication network 122.

The vendor devices 104 may each include a vendor transaction module 106A or 106B (hereinafter, "vendor module" 106). In some embodiments, the vendor modules 106 may include code and routines configured to enable their respective vendor device 104 to interact with the merchant server 124 and/or one or more other of the environment components. The buyer device 110 may include a buyer transaction module 108 (hereinafter, "buyer module" 108). The buyer module 108 may include code and routines configured to enable the buyer device 110 to interact with the merchant server 124 and/or one or more other of the environment components. Interaction between the buyer device 110 and the vendor device 104 may include listing or offering products for sale, communicating transaction inputs configured to initiate execution of a transaction, communication of transaction confirmations, and the like.

The buyer module 108 and/or the vendor module 106 may be implemented using hardware including a processor, a microprocessor (e.g., to perform or control performance of one or more operations), a field-programmable gate array (FPGA), or an application-specific integrated circuit (ASIC). In some other instances, the buyer module 108 and/or the vendor module 106 may be implemented using a combination of hardware and software. Implementation in software may include rapid activation and deactivation of one or more transistors or transistor elements such as may be included in hardware of a computing system (e.g., the vendor device 104 and the buyer device 110). Additionally, software defined instructions may operate on information within transistor elements. Implementation of software instructions may at least temporarily reconfigure electronic pathways and transform computing hardware.

In some embodiments instead of inclusion of the buyer module 108 and/or the vendor module 106, the buyer device 110 and/or the vendor devices 104 may be configured to interface with the environment components in a browser.

The third party and government server 131 may include a hardware server that includes a processor, memory, and network communication capabilities. The third party and government server 131 may be configured for communication with one or more other environment components via the communication network 122. As discussed above, the third party and government server 131 may be associated with the government entity 133 and/or a third party 135.

The third party and government server 131 may be implemented in multi-leg transaction that involves a transaction with an entity other than the vendors 116, the buyer 102, and the merchant 125. For example, the multi-leg transaction may include a customs fee, which may be implemented at the third party and government server 131 under direction of the government entity 133. Additionally or alternatively, the multi-leg transaction may include a processing fee, which may be implemented at the third party and government server 131 under direction of the third party 135.

The merchant server 124 may include a hardware server that includes a processor, memory, and network communication capabilities. The merchant server 124 may be configured for communication with one or more other environment components via the communication network 122.

As discussed above, the merchant server 124 may be associated with the merchant 125. The merchant 125 may include any entity that facilitates or enables transactions between the vendors 116, the buyer 102, the government entity 133, the third party 135, or some combination thereof.

In some embodiments, there may be no distinction between one or both of the vendors 116 and the merchant 125. For example, instead of the merchant 125 being associated with the merchant server 124, the vendor 116 may be associated with the merchant server 124. For example, the vendor 116 that is involved in the multi-leg transaction with the buyer 102 may interact with the buyer 102 directly. In these and other embodiments, instead of the buyer 102 providing transaction input to the merchant 125 or another third party that acts as an intermediary between the buyer 102 and the vendor 116, the vendor 116 and/or the vendor device 104 may at least partially process the multi-leg transaction.

The merchant server 124 may include the website module 119 and a merchant transaction module 118. The website module 119 may be configured to host or support a website. Some embodiments of the website may support an electronic marketplace. The electronic marketplace may enable products and services to be offered for sale, viewed, purchased, or some combination thereof. The website may enable interaction therewith using the buyer device 110 and/or the vendor devices 104. For instance, the vendors 116 may utilize the vendor device 104 to offer for sale a product via the website. Additionally, the website may enable purchase of the products listed on the website using the buyer device 110.

The merchant transaction module 118 may be configured to process, at least partially, multi-leg transactions. In some embodiments, the merchant transaction module 118 may be configured to designate the sub-transactions as a coupled group. Additionally or alternatively, the merchant transaction module 118 may communicate transaction information and the designation of the sub-transactions as a coupled group to the financial server 128. The communication of the transaction information and/or the designation may be in response to an application program interface (API) call communicated to the merchant server 124 via the communication network 122. In these and other embodiments, a financial transaction module 121 may determine whether the sub-transactions are authorized. In other embodiments, the merchant transaction module 118 may be configured to designate the sub-transactions as a coupled group and determine whether the sub-transactions are authorized.

The merchant transaction module 118 may be implemented using hardware including a processor, a microprocessor (e.g., to perform or control performance of one or more operations), an FPGA, or an ASIC. In some other instances, the merchant transaction module 118 may be implemented using a combination of hardware and software. Implementation in software may include rapid activation and deactivation of one or more transistors or transistor elements such as may be included in hardware of a computing system (e.g., the merchant server 124). Additionally, software defined instructions may operate on information within transistor elements. Implementation of software instructions may at least temporarily reconfigure electronic pathways and transform computing hardware.

The financial server 128 may include a hardware server that includes a processor, memory, and network communication capabilities. The financial server 128 may be configured for communication with one or more other environment components via the communication network 122.

The financial server 128 may be configured to transfer funds (e.g., currency, bitcoins, credit, etc.) during or associated with a multi-leg transaction in the operating environment 100. The financial server 128 may transfer funds between accounts 144, which may be stored or accessed by the financial server 128.

The financial server 128 may include information related to the accounts 144 that may be managed by the financial service entity 123 or the bank 127. The accounts 144 may be held by the buyer 102, the vendors 116, the merchant 125, the government entity 133, the third party 135, or some combination thereof. In some embodiments, the financial server 128 may enable transfers of funds between the accounts 144 or to accounts managed by other institutions (e.g., banks) that may be held by the buyer 102, the vendors 116, the merchant 125, the government entity 133, the third party 135, or some combination thereof. For example, to purchase a good from the vendor 116, the buyer 102 may transfer funds from one of the accounts 144 held by the buyer 102 to another of the accounts 144 held by the vendor 116. Similarly, to pay the government entity 133, the buyer 102 may transfer funds from one of the accounts 144 held by the buyer 102 to one of the accounts 144 held by the government entity 133.

The financial server 128 may include transaction records 146. The transaction records 146 may include record of previous transactions performed by the buyer 102 and/or the vendors 116. In addition, the transaction records 146 may include dates of transactions, amount of funds transferred in previous transactions, credit limits of the buyer 102, the accounts 144 involved in transactions, or some combination thereof.

The financial server 128 may include a financial transaction module 121. The financial transaction module 121 may be configured to process multi-leg transactions. For example, in some embodiments, the financial transaction module 121 may receive from the merchant server 124, the designation of the sub-transactions of a pending multi-leg transaction as a coupled group. The financial transaction module 121 may receive transaction input used to indicate conditional execution of the multi-leg transaction. Prior to execution of the multi-leg transaction and in substantially real time, the financial transaction module 121 may determine whether each of the sub-transactions in the coupled group is authorized.

In some embodiments, determining whether sub-transactions in the coupled group are authorized may include the generating, by the financial transaction module 121, a list of the sub-transactions. The financial transaction module 121 may call transaction information that includes transaction details of each of the sub-transactions. The financial transaction module 121 may the parse the transaction information for the portions used in authorization determinations. The financial transaction module 121 may delay authorization confirmation of each of the sub-transactions until all of the sub-transactions have been authorized. The financial transaction module 121 may input the portions of the transaction information into one or more authorization processes. The authorization processes ensure the buyer 102 has sufficient funds to complete the sub-transactions. The authorization processes may be based on a payment type selected by the buyer 102. The financial transaction module 121 may compare the list of the two or more sub-transactions with a list of authorized sub-transactions.

In response to any of the sub-transactions being unauthorized, the financial transaction module 121 may prevent execution of the multi-leg transaction. In response to authorization of each of the sub-transactions, the financial transaction module 121 may execute or enable execution of the multi-leg transaction. The execution of the sub-transactions may be non-sequential.

The financial server 128 may be associated with the bank 127 or the financial service entity 123. The bank 127 may include any financial institution with governmental authorization to receive deposits and act as an intermediary in transactions. Examples of the bank 127 may include traditional banks (e.g., WELLSFARGO®) or online banks.

The financial server 128 may be associated with the financial service entity 123. Examples of the financial service entity 123 may include an online money transfer system (e.g., PAYPAL®) or an entity that holds or accounts for balances on gift cards, prepay cards, and the like.

Following execution of the multi-leg transaction, the sub-transactions may be ungrouped or may remain grouped. Whether the subsequent transactions are grouped or ungrouped may depend on several factors or a combination thereof. For example, whether the subsequent transactions are grouped or ungrouped may be based on payment type, a preference or selection of the merchant 125 and/or the vendor(s) 116, a default setting of the merchant 125 and/or the vendor(s) 116, processing overhead involved in cascading the subsequent transactions, type of subsequent transaction, type of multi-leg transaction, other factors, or some combination thereof. For example, in some embodiments, the merchant server 124 may set a default setting such that the coupled groups remaining grouped for subsequent transactions. Thus, most refunds or other subsequent transactions affect each of the sub-transactions included in the multi-leg transaction. In these and other embodiments, the merchant server 124 may be configured with an override. The override may be implemented to alter the default. Thus, the override may ungroup the sub-transactions in some circumstances as dictated by the merchant 125.

In embodiments in which the sub-transactions are ungrouped, subsequent transactions regarding the sub-transactions may be performed independently. For example, following the execution of the multi-leg transaction, the buyer 102 may want a refund for one of the sub-transactions. The buyer 102 may communicate a refund request for one of the sub-transactions to the merchant server 124. The merchant server 124 may forward the refund request to the financial server 128. In response to the refund request, the financial server 128 may refund a first amount exchanged for the one sub-transaction without refunding a second amount exchanged for the other sub-transactions. Additionally or alternatively, the buyer 102 may want to upgrade or modify one of the sub-transactions. For instance, the buyer 102 may subsequently upgrade shipping or upgrade a vehicle in a car rental sub-transaction.

In embodiments in which the sub-transactions remain grouped, subsequent transactions may cascade or may otherwise affect each of the sub-transactions. For example, following the execution of the multi-leg transaction, the buyer 102 may want a refund for one of the sub-transactions. The buyer 102 may communicate a refund request for one of the sub-transactions to the merchant server 124. The merchant server 124 may forward the refund request to the financial server 128. In response to the refund request, the financial server 128 may refund a first amount exchanged for the one sub-transaction. The refund request may then cascade to the other sub-transactions. Accordingly, a single refund request may result in a refund of a second amount exchanged for the other sub-transactions.

In the operating environment 100, memory in one or more of the environment components may be similar to memory 508 described with reference to FIG. 5, processors in one or more of the environment components may be similar to a processor 504 described with reference to FIG. 5, and network communication capabilities of one or more of the environment components may be provided by a communication unit 502 described with reference to FIG. 5.

Modifications, additions, or omissions may be made to the operating environment 100 without departing from the scope of the present disclosure. Specifically, embodiments depicted in FIG. 1 may include one or more vendor devices 104 associated with one or more vendors 116, one or more buyer devices 110 associated with one or more buyers 102, one or more merchant servers 124 associated with one or more merchants 125, one or more financial servers 128 associated with one or more banks 127 and/or one or more financial service entities 123, one or more third party or government services 131, or any combination thereof.

Moreover, the separation of various components in the embodiments described herein is not meant to indicate that the separation occurs in all embodiments. It may be understood with the benefit of this disclosure that the described components may be integrated together in a single component or separated into multiple components.

Figure 2A:
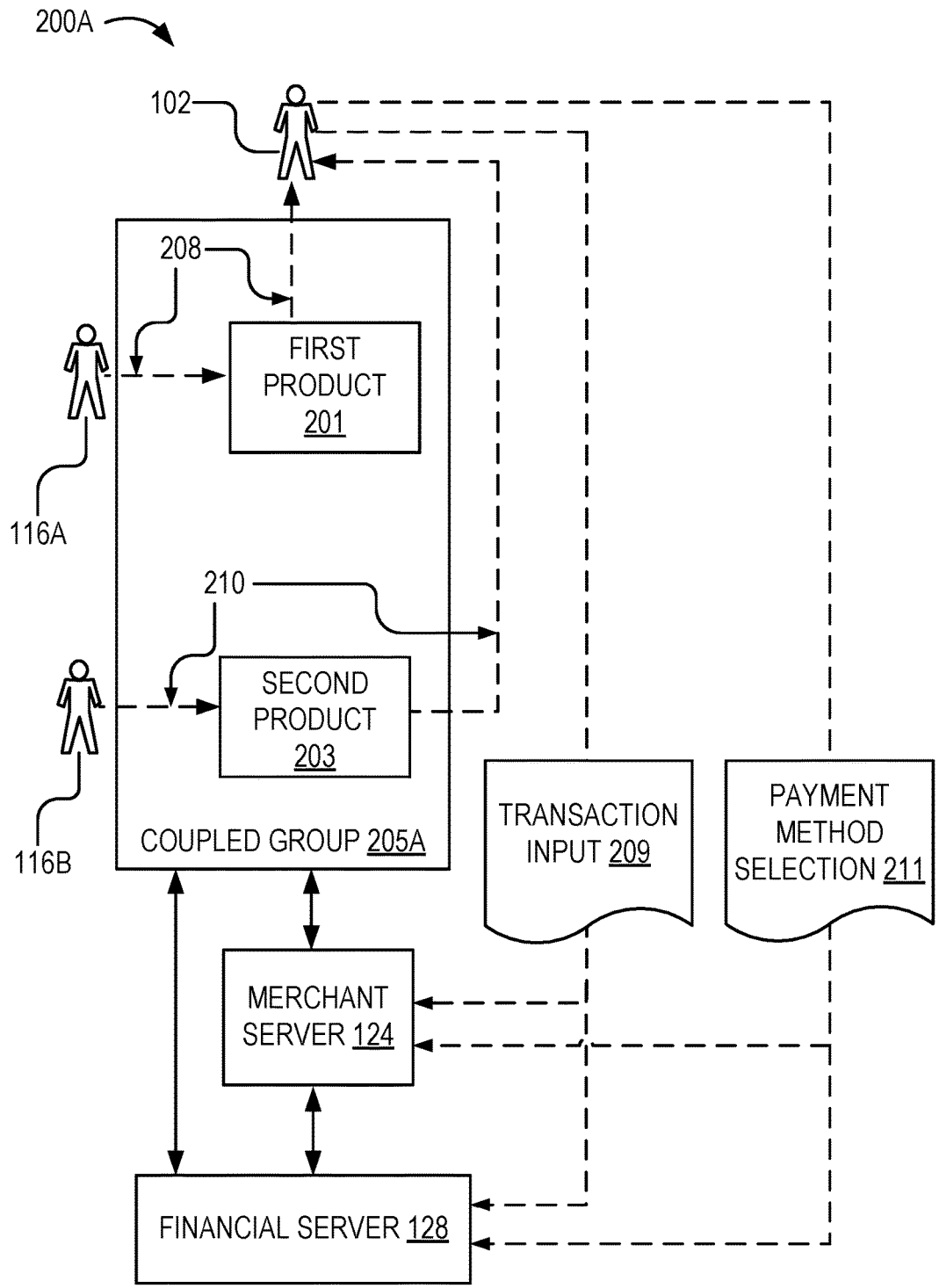
FIG. 2A is a block diagram of a first example coupled group that may be implemented in the operating environment of FIG. 1.
Figure 2B:
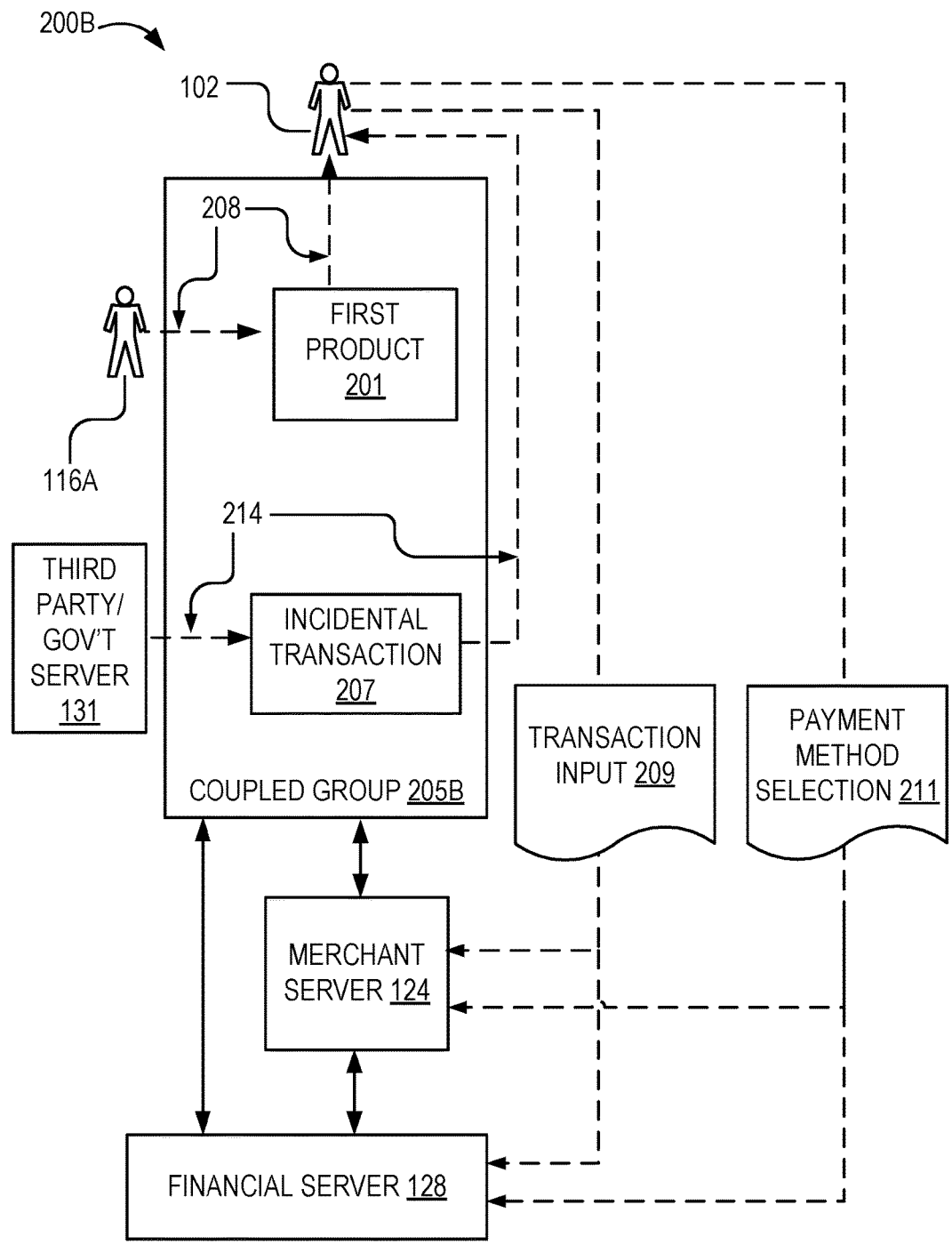
FIG. 2B is a block diagram of a second example coupled group that may be implemented in the operating environment of FIG. 1.

FIGS. 2A and 2B are block diagrams 200A and 200B of example coupled groups 205A and 205B that may be implemented in the operating environment 100 of FIG. 1. FIGS. 2A and 2B include the buyer 102, the vendors 116, the merchant server 124. and the financial server 128 described with reference to FIG. 1. The communication network 122, the buyer device 110, and the vendor devices 104 are omitted from FIGS. 2A and 2B. However, it may be understood with the benefit of this disclosure that the buyer 102 and the vendors 116 may interact with the merchant server 124 and/or the financial server 128 via the buyer device 110, the vendor devices 104, and the communication network 122.

Referring to FIG. 2A, a first sub-transaction for a first product 201 may involve the buyer 102 and a first vendor 116A. The first sub-transaction is indicated by reference number 208. A second sub-transaction for a second product 203 may involve the buyer 102 and a second vendor 116B. The second sub-transaction is indicated by reference number 210. Both of the first product 201 and the second product 203 may be placed in a checkout cart or similar transaction interface provided by the merchant server 124. The merchant server 124 may designate the first sub-transaction 208 and the second sub-transaction 210 as a coupled group 205A.

The embodiment of FIG. 2A includes two vendors 116A and 116B. In other embodiments, the first product 201 and the second product 203 may both be sold by one of the vendors 116A or 116B or may be sold by the merchant (e.g., 125) associated with the merchant server 124. In these and other embodiments, the merchant server 124 may designate the first sub-transaction 208 and the second sub-transaction 210 as the coupled group 205A. Additionally, the merchant server 124 may be omitted. In these and other embodiments, the financial server 128 may designate the first sub-transaction 208 and the second sub-transaction 210 as the coupled group 205A.

Referring to FIG. 2B, the first sub-transaction 208 may be substantially similar to the first sub-transaction 208 of FIG. 2A. A third sub-transaction includes an incidental transaction 207 between the buyer 102 and the third party or governmental server 131. The third sub-transaction is indicated by reference number 214.

When of the first product 201 is placed in a checkout cart or similar transaction interface provided by the merchant server 124, the merchant server 124 may recognize need for the incidental transaction 207. Accordingly, the merchant server 124 may designate the first sub-transaction 208 and the third sub-transaction 214 as another coupled group 205B.

The embodiment of FIG. 2B includes the first vendors 116A. In other embodiments, the first product 201 may be sold by the merchant (e.g., 125) associated with the merchant server 124. In these and other embodiments, the merchant server 124 may designate the first sub-transaction 208 and the third sub-transaction 214 as the coupled group 205B. Additionally, in some embodiments, the merchant server 124 may be omitted. In these and other embodiments, the financial server 128 may designate the first sub-transaction 208 and the third sub-transaction 214 as the coupled group 205B.

In some embodiments, the designation of the sub-transactions 208 and 210 or 208 and 214 may include a type of the multi-leg transaction including the coupled group 205A/205B. For example, the designation in FIG. 2A may indicate that the multi-leg transaction includes related sub-transactions for purchase of the products 201 and 203 by the buyer 102. The designation in FIG. 2B may indicate that the multi-leg transaction includes a purchase of the first products 201 and the incidental transaction 207 by the buyer 102.

With reference to FIGS. 2A and 2B, the buyer 102 may communicate transaction input 209 to the merchant server 124 and/or the financial server 128. For instance, in multi-leg transactions in which the merchant server 124 is involved, the transaction input 209 may be communicated to the merchant server 124 and in multi-leg transactions in which the merchant server 124 is omitted, the transaction input 209 may be communicated to the financial server 128. The transaction input 209 may be used to indicate conditional execution of the multi-leg transaction including the coupled group 205A. For example, the transaction input 209 may include selection by the buyer 102 of an icon on the checkout cart.

Additionally or alternatively, a payment type selection 211 may be communicated from the buyer 102 to the merchant server 124 and/or the financial server 128. For instance in multi-leg transactions in which the merchant server 124 is involved, the payment type selection 211 may be communicated to the merchant server 124 and in multi-leg transactions in which the merchant server 124 is omitted, the payment type selection 211 may be communicated to the financial server 128. The payment type selection 211 may indicate which type or types of payment are to be used in the multi-leg transaction.

Although FIGS. 2A and 2B depict two types of multi-leg transactions (e.g., purchase of multiple-related products 201 and 203 or a product purchase with the incidental transaction 207), coupled groups (e.g., 205A and 205B) may be designated in other types of multi-leg transactions. For example, the coupled groups may be designated in multi-leg transactions that include chained payments, coupled payments, split payments, partner fees, other types of transactions including multiple sub-transactions, other types of transactions including multiple payment units, or combinations thereof.

FIGS. 3A-3E illustrates example multi-leg transaction processes 300A-300E (generally, process 300 or processes 300) that may be performed in the operating environment 100 of FIG. 1. The processes 300 depicted in FIGS. 3A-3E include the merchant server 124 and the financial server 128 of FIG. 1. The processes 300 include communication between the merchant server 124 and the financial server 128. However, it may be understood with the benefit of this disclosure that the processes 300 may be performed in embodiments in which the multi-leg transaction is performed directly between the buyer 102 and the vendors 116 or devices (e.g., 110 and 104) of FIG. 1 associated therewith. In these and other embodiments communications are between the vendor device 104 or the buyer device 110 and the financial server 128 rather than the merchant server 124 and the financial server 128.

The financial server 128 in each of FIGS. 3A-3E includes an example embodiment of the financial transaction module 121A-121E. Each of the financial transaction modules 121A-121E of FIGS. 3A-3E depict an authorization process. Although shown separately, one or more of the financial transaction modules 121A-121E may be implemented together in a single embodiment.

With reference to FIGS. 3A-3E, the merchant server 124 may be configured to communicate transaction information 301 to the financial server 128. In some embodiments, the financial transaction modules 121A-121E may include an API caller module 302. The API caller module 302 may be configured to communicate an API call to the merchant server 124 for the transaction information 301 or some portion thereof.

Figure 4:
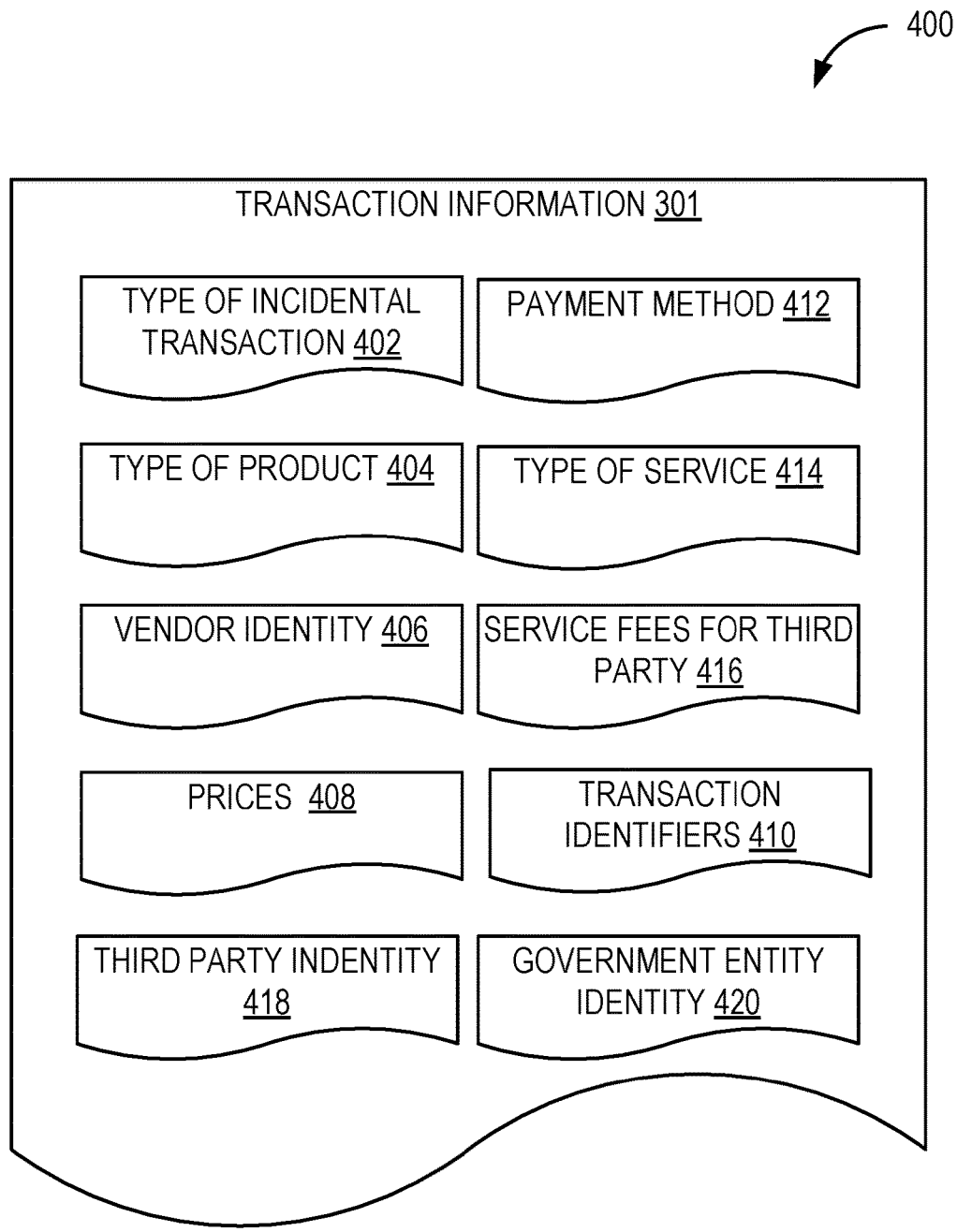
FIG. 4 is a block diagram of example transaction information that may be implemented in the multi-leg transaction process of FIGS. 3A-3E.

With reference to FIG. 4, an example of the transaction information 301 is depicted. The transaction information 301 may include data related to one or more sub-transactions in a multi-leg transaction. The data in the transaction information 301 may be used to authorize the sub-transactions. For example, the transaction information 301 of FIG. 4 may include a type of incidental transaction 402, a payment type 412, a type of product 404, a type of service 414, a vendor identity 406, a service fee for a third party 416, a price 408, a transaction identity 410, a third party identity 418, a government entity identity 420, other data related to the one or more sub-transactions, or some combination thereof.

Referring back to FIGS. 3A-3E, the merchant server 124 may also be configured to communicate a coupled group designation 303 to the financial server 128. For example, with combined reference to FIGS. 2A-3E, the coupled group designation 303 may include data and information that indicates that the first sub-transaction 208 and the second sub-transaction 210 are designated as the coupled group 205A or that indicates the first sub-transaction 208 and the third sub-transaction 214 are designated as the coupled group 205B. In some embodiments, the API caller module 302 may be configured to communicate an API call to the merchant server 124 for the coupled group designation 303.

In FIGS. 3A-3E, the coupled group designation 303 may include two sub-transactions (P1, P2). Each of the sub-transactions P1 and P2 may represent one of the sub-transactions (e.g., 210, 208, and 214 of FIGS. 2A and 2B) included in a coupled group. The sub-transactions P1 and P2 and the transaction information 301 related thereto are input to the financial transaction modules 121A-121E. Generally, the financial transaction modules 121A-121E determine whether the sub-transactions P1 and P2 are authorized using one or more authorization processes. In response to whether the sub-transactions P1 and P2 are authorized, the financial server 128 generates authorization results 305. The authorization results 305 are communicated to the merchant server 124. The merchant server 124 may then communicate an authorization message 307 to the buyer 102 and/or the vendor 116.

In addition, in response to either of the sub-transactions P1 and P2 not being authorized the multi-leg transaction including the sub-transactions P1 and P2 may be executed or may be prevented from being executed. In some embodiments, the financial server 128 may execute or prevent execution of the multi-leg transaction. In some embodiments, the merchant server 124 may execute or prevent execution of the multi-leg transaction based on the authorization results 305.

Figure 3A:
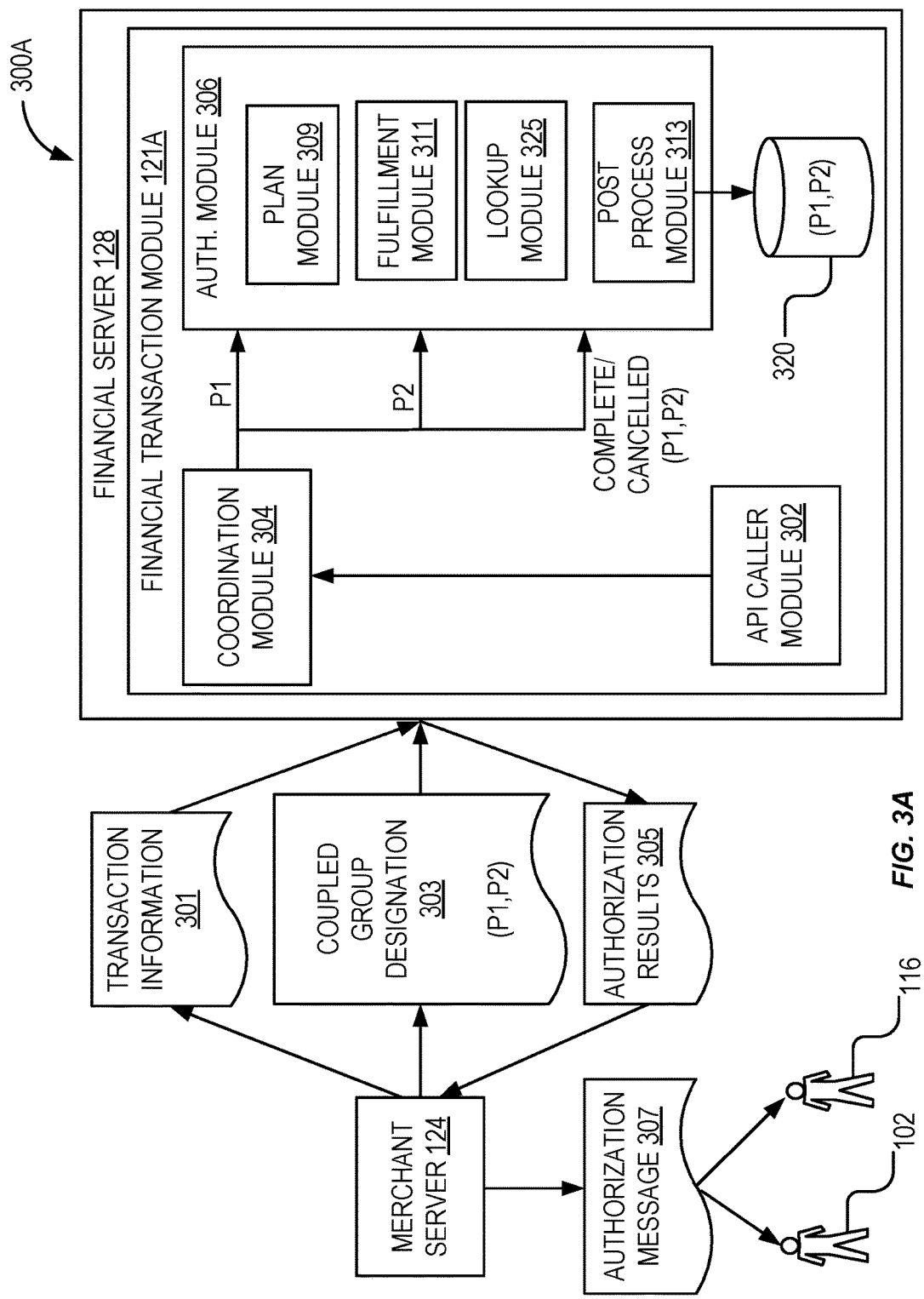
FIG. 3A illustrates an example multi-leg transaction process that may be performed in the operating environment of FIG. 1.
Figure 3B:
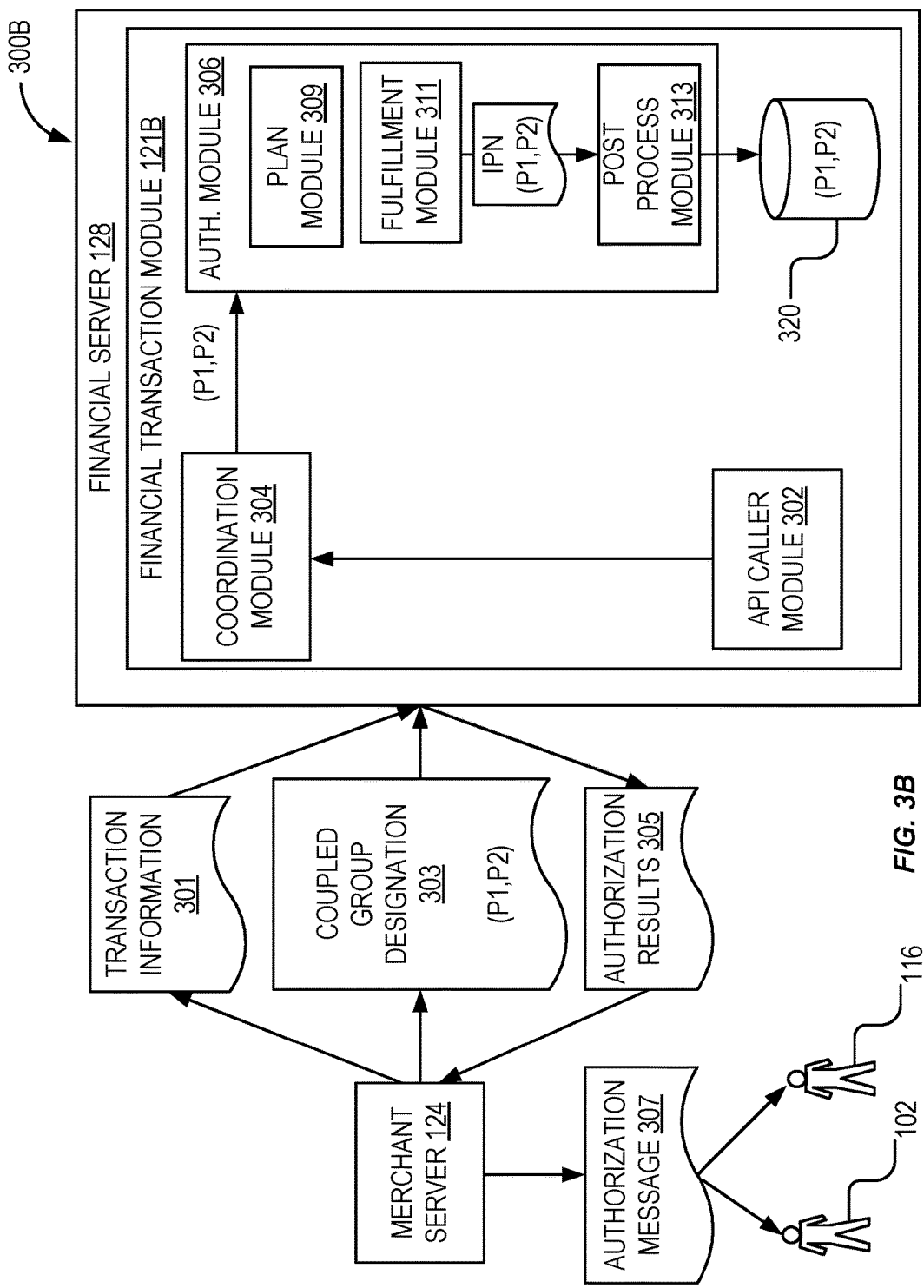
FIG. 3B illustrates another example multi-leg transaction process that may be performed in the operating environment of FIG. 1.
Figure 3C:
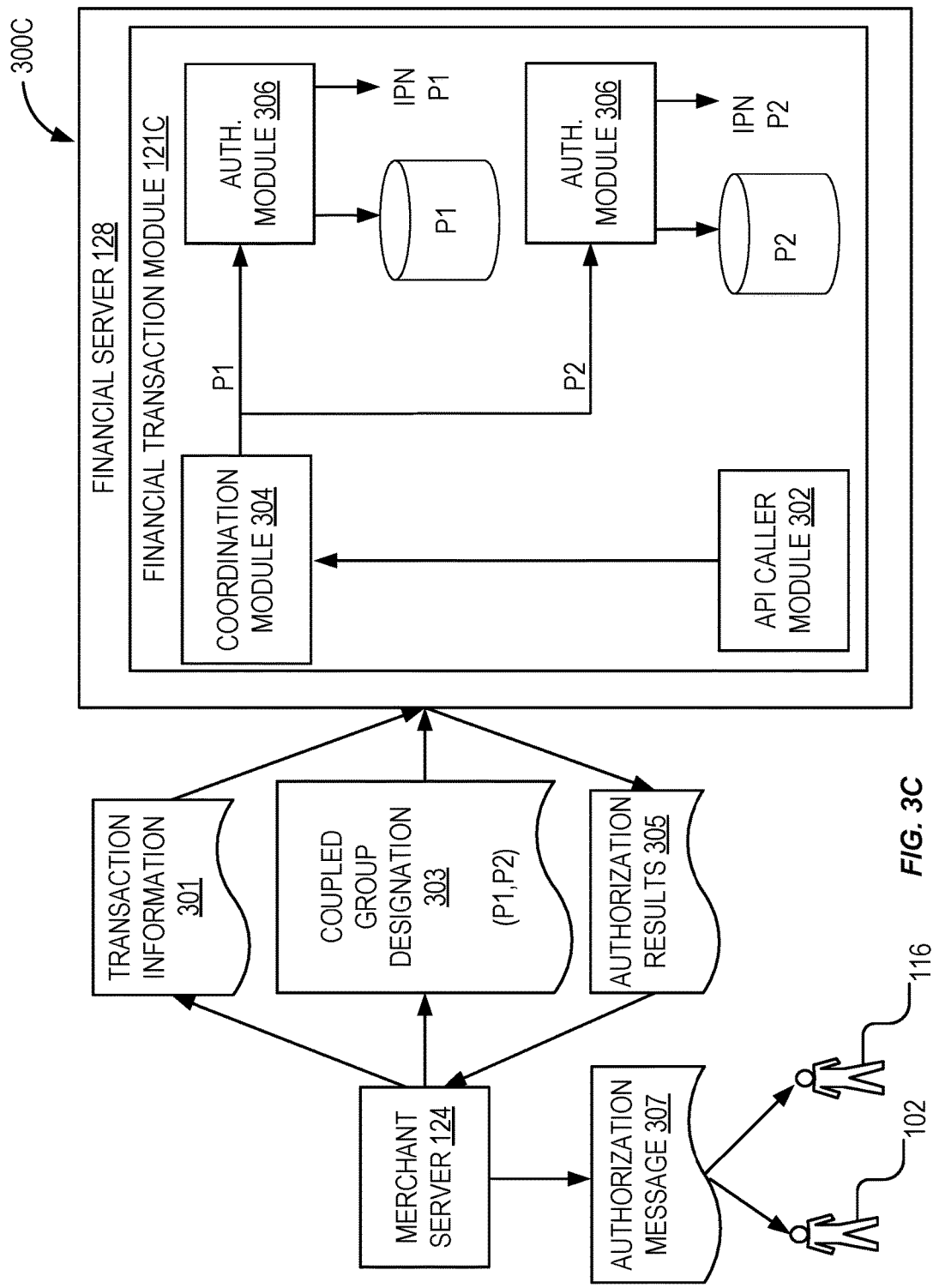
FIG. 3C illustrates another example multi-leg transaction process that may be performed in the operating environment of FIG. 1.
Figure 3D:
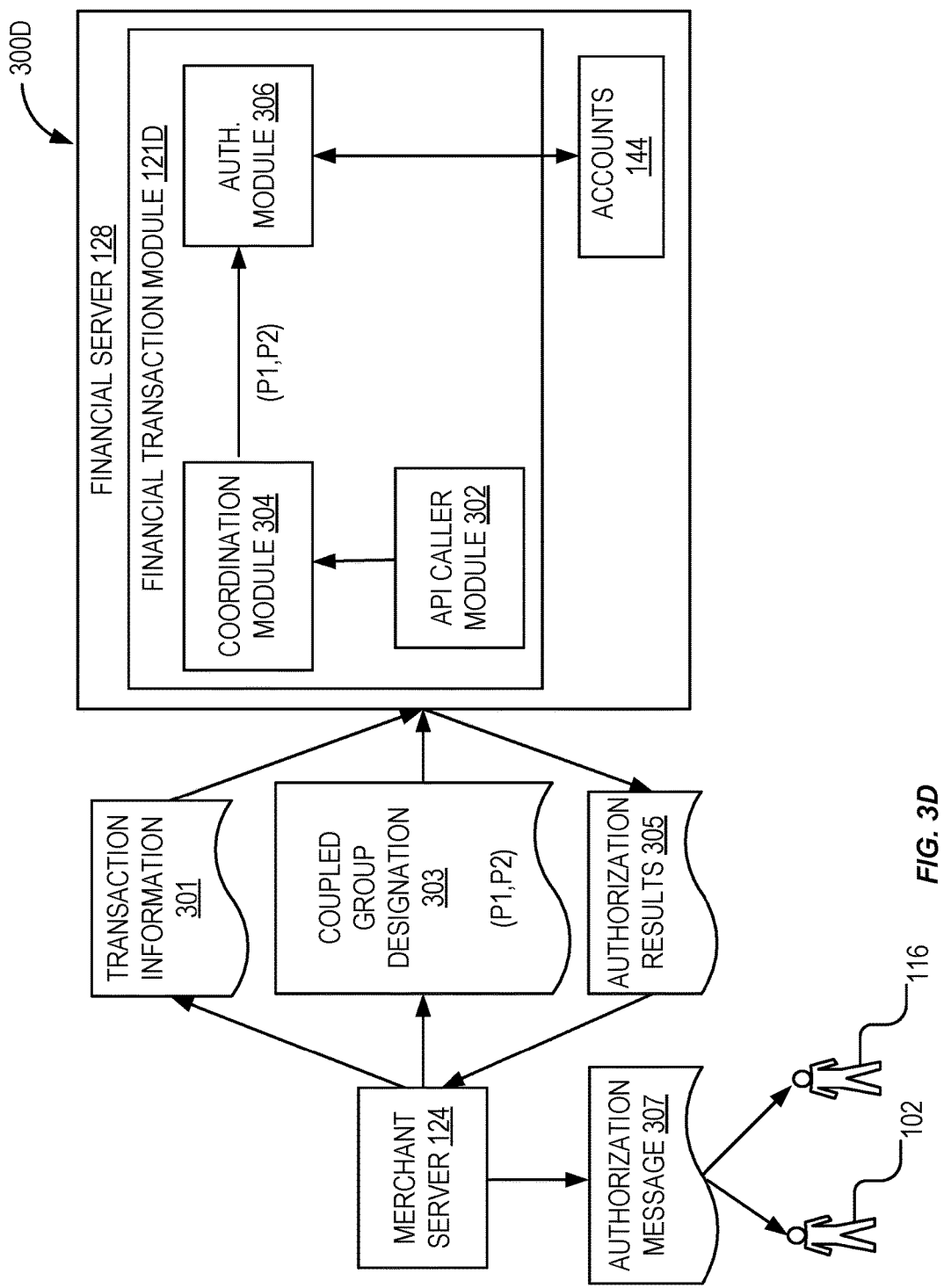
FIG. 3D illustrates another example multi-leg transaction process that may be performed in the operating environment of FIG. 1.
Figure 3E:
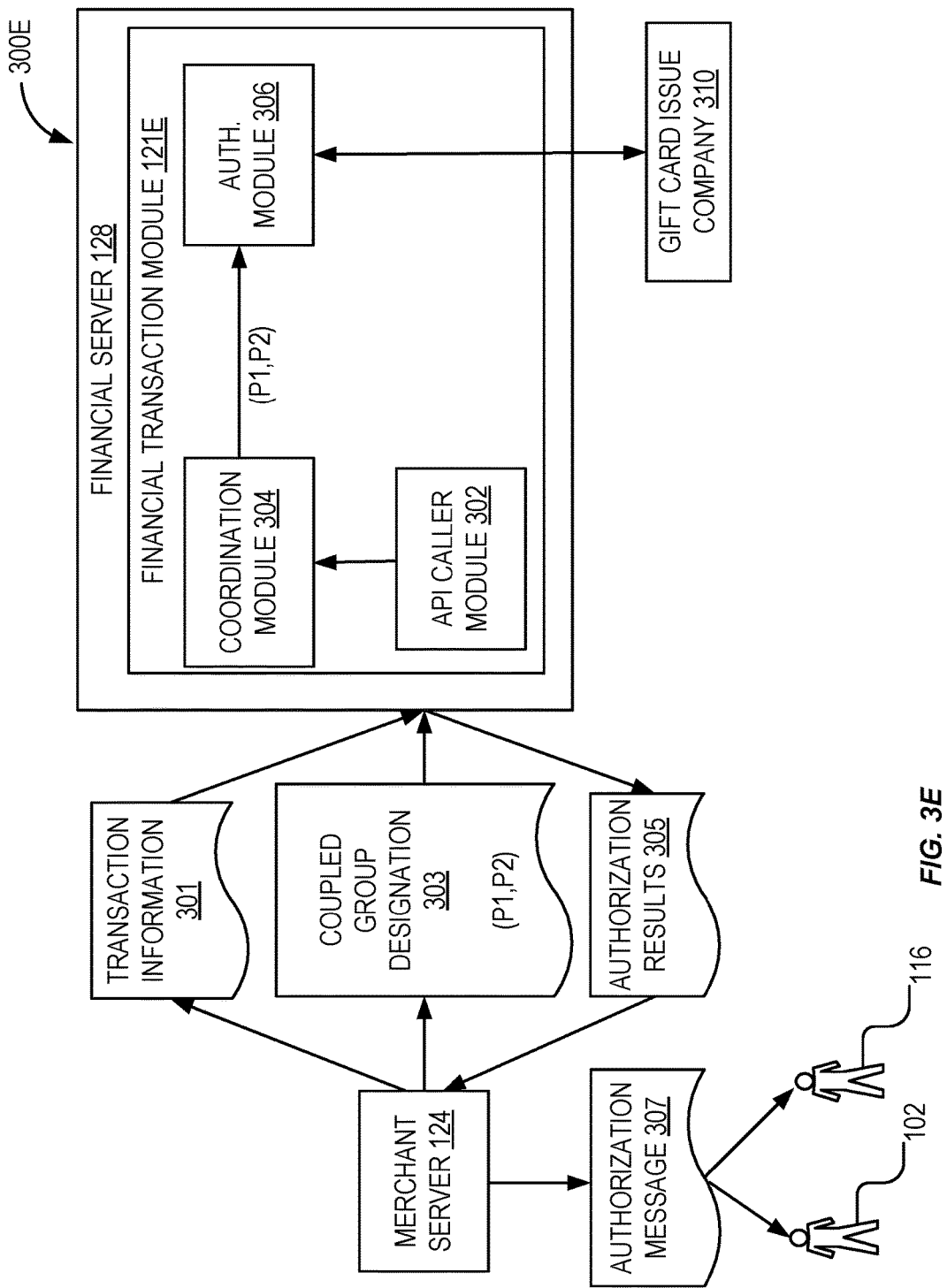
FIG. 3E illustrates another example multi-leg transaction process that may be performed in the operating environment of FIG. 1.

In the following paragraphs, each of the financial transaction modules 121A-121E is described. The financial transaction modules 121A-121E include an authorization process. The authorization process may be based on a selected payment type (e.g., 211 of FIGS. 2A and 2B). FIGS. 3A-3C are example authorization processes that may be implemented in response to a selection of an online money transfer system as a payment type. FIG. 3D is an example authorization process that may be implemented in response to a selection of a credit card as a payment type. FIG. 3E is an example authorization process that may be implemented in response to a selection of a gift card or prepaid card.

In financial transaction modules 121A, 121B, and 121C of FIGS. 3A-3C, the API caller module 302 may forward the coupled group designation 303 and/or portions of the transaction information 301 to a coordination module 304. In some embodiments, the coordination module 304 may parse the transaction information 301 for the portions used in authorization processes.

The coordination module 304 may be configured to coordinate and process the sub-transactions P1 and P2. In some embodiments, the coordination module 304 may coordinate and process the sub-transactions P1 and P2 using API calls or similar communications or instructions. In FIGS. 3A-3C, the coordination module 304 may coordinate and process risk assessments for each of the sub-transactions P1 and P2. In some embodiments, the coordination module 304 may generate a list of the sub-transactions P1 and P2. The coordination module 304 may then delay authorization confirmation or immediate payment notification (IPN) of any of the sub-transactions P1 and P2 until all of the sub-transactions P1 and P2 have been authorized.

The coordination module 304 may input the portions of the transaction information 301 into one or more authorization modules 306 (in FIGS. 3A-3E "auth. module"). The authorization modules 306 may perform an authorization process that ensures the buyer 102 has sufficient funds to complete each of the sub-transactions P1 and P2 according to a selected payment type. The coordination module 304 may then compare the list of the sub-transactions with a list of authorized sub-transactions.

In FIG. 3A, the financial transaction module 121A is configured to perform multiple risk assessments. In particular, in the embodiment of FIG. 3A the financial transaction module is configured to perform one risk assessment for each of the sub-transactions P1 and P2. In the financial transaction module 121A, the authorization module 306 may include a plan module 309, a fulfillment module 311, a lookup module 325, and a post process module 313. The plan module 309 may be configured to perform a risk assessment of each of the sub-transactions P1 and P2, which may be the basis of the authorization. For example, the plan module 309 may use portions of the transaction information 301 to perform risk assessments.

The fulfillment module 311 may make arrangements to transfer funds or fulfill each of the sub-transactions P1 and P2. The fulfillment module 311 may also finalize the fulfillment of the sub-transactions. When both of the sub-transactions P1 and P2 have been fulfilled and finalized, the fulfillment module 311 may communicate an IPN for both of the sub-transactions P1 and P2 to the post process module 313. The fulfillment module 311 may have one or more configurations. In a first embodiment of the fulfillment module 311, the IPN is held until both the sub-transactions are authorized and the fulfillment module 311 has finalized the sub-transactions. In a second embodiment of the fulfillment module 311, the IPN is published following the fulfillment of each of the sub-transactions P1 or P2. In a third embodiment of the fulfillment module 311, during processing a subset of the sub-transactions P1 or P2, the IPN may be published following the fulfillment while others may not until finalization.

The lookup module may be configured to identify and locate entities involved in the sub-transactions P1 and P2. For example, in circumstances in which the multi-leg transaction includes a chain payment, the lookup module 325 may look up a primary entity and one or more secondary entities.

The post process module 313 may perform post payment tasks and communicate a message indicating the authorization results 305 are successful. In some embodiments, the sub-transactions P1 and P2 may be stored or registered in a database 320.

In FIGS. 8A-10E, sequence diagrams 800A-800F, 900A-900E, and 1000A-1000E depict authorization processes and authorization failures in the financial transaction module 121A. FIGS. 8A-8F represent the authorization processes and authorization failures according to the first embodiment of the fulfillment module 311. FIGS. 9A-9E represent the authorization processes and authorization failures according to the second embodiment of the fulfillment module 311. FIGS. 10A-10E represent the authorization processes and authorization failures according to the third embodiment of the fulfillment module 311. FIGS. 8A-10E include the API caller module 302, the coordination module 304, the plan module 309, the fulfillment module 311, and the post process module 313. The multi-leg transaction in FIGS. 8A-10E does not use the lookup module 325.

Figure 8A:
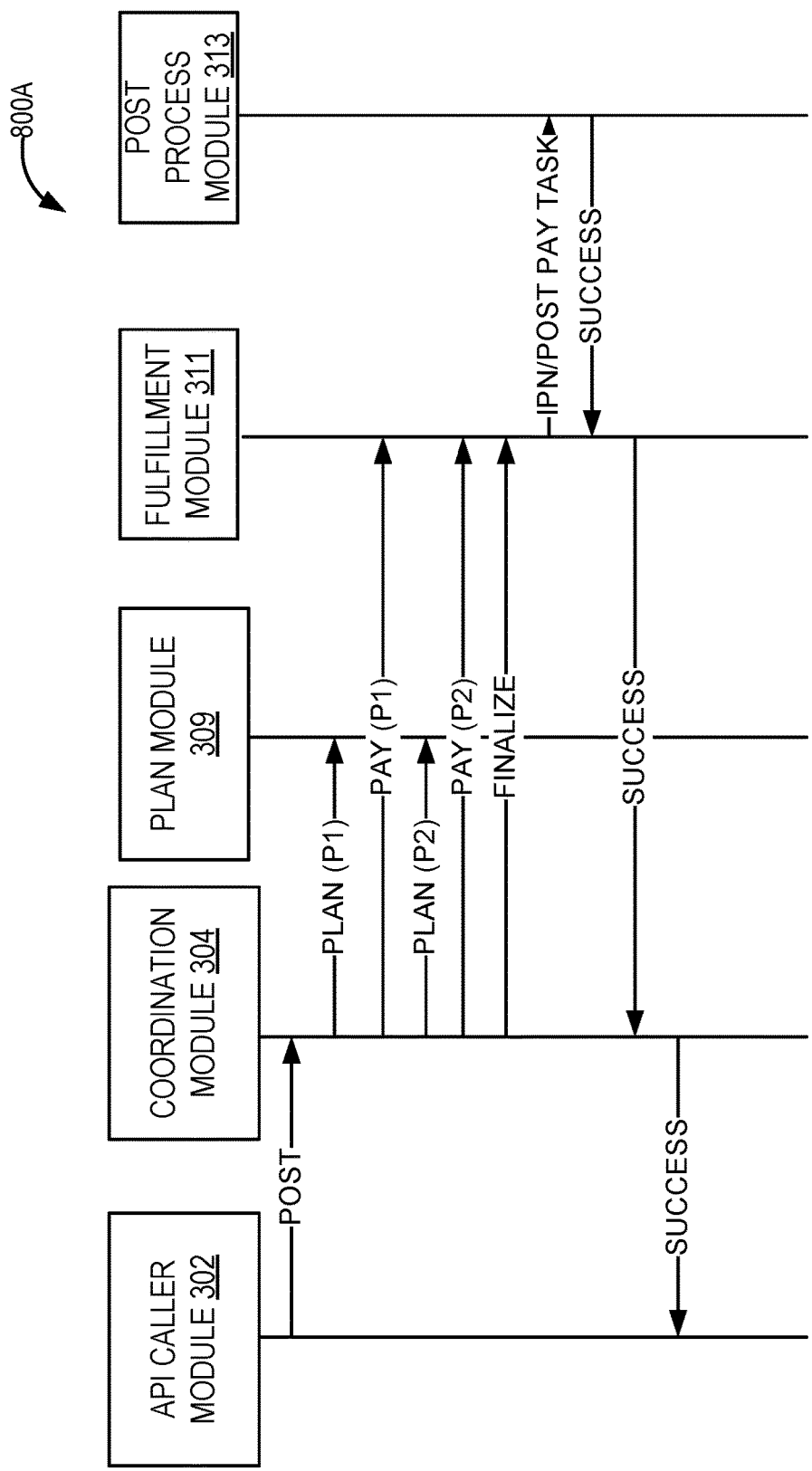
FIGS. 8A-8F are sequence diagrams that represent authorization processes that may occur in the multi-leg transaction process of FIG. 3A.
Figure 9A:
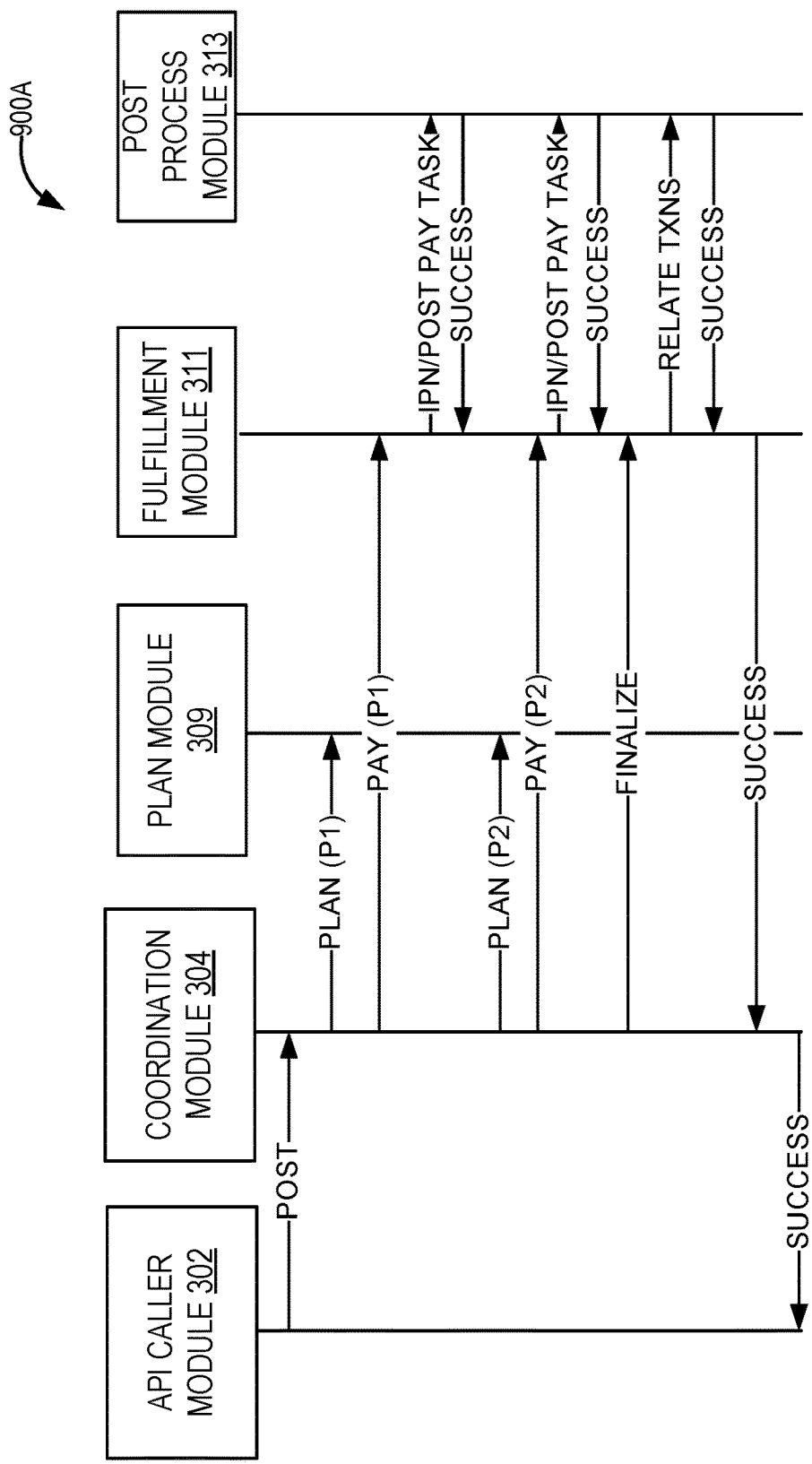
FIGS. 9A-9E are sequence diagrams represent authorization processes that may occur in the multi-leg transaction process of FIG. 3A.
Figure 10A:
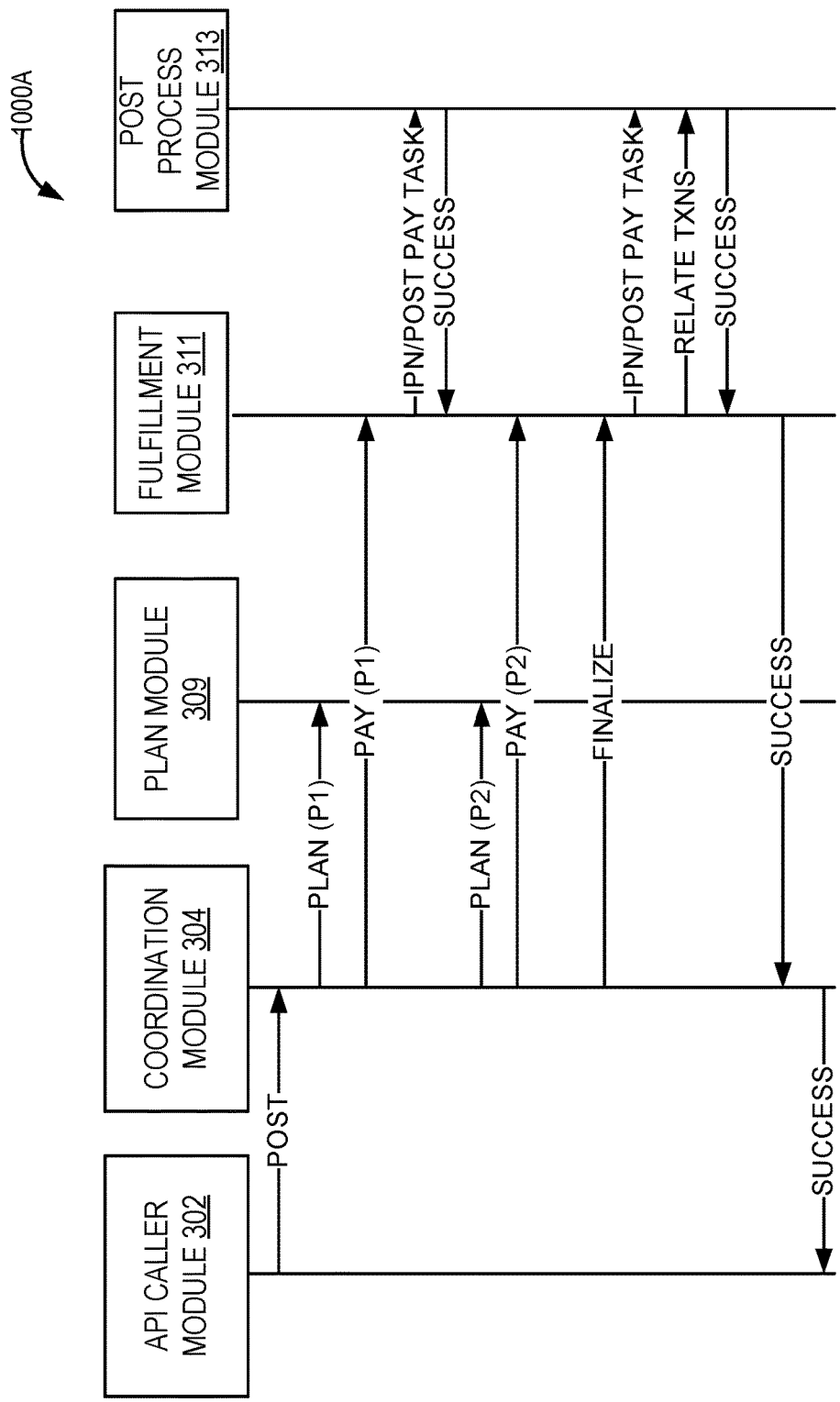
FIGS. 10A-10E are sequence diagrams represent authorization processes that may occur in the multi-leg transaction process of FIG. 3A.

FIGS. 8A, 9A, and 10A depict a successful authorization of a multi-leg transaction. A sequence diagram 800A that represents the successful authorization in the financial transaction module 121A according to the first embodiment of the fulfillment module 311 is depicted in FIG. 8A. A sequence diagram 900A for the successful authorization in the financial transaction module 121A according to the second embodiment of the fulfillment module 311 is depicted in FIG. 9A. A sequence diagram 1000A for the successful authorization in the financial transaction module 121A according to the third embodiment of the fulfillment module 311 is depicted in FIG. 10A.

Figure 8B:
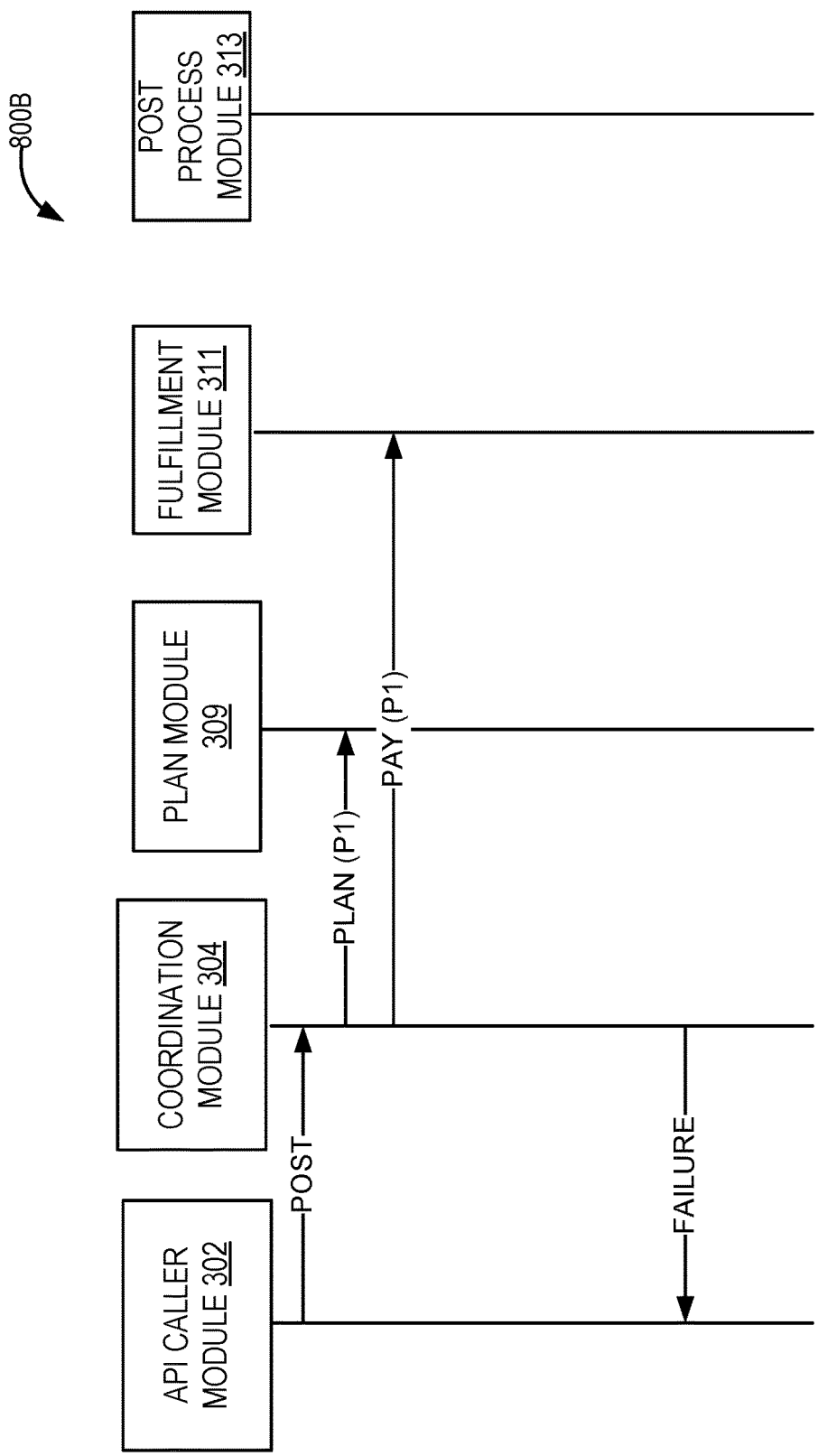

In response to the first sub-transaction P1 failing the risk assessments, the coordination module 304 may generate a first sub-transaction P1 authorization failure message that is included in the authorization results 305. A risk assessment of the second sub-transaction P2 may not be performed. A sequence diagram 800B for the failure to authorize the first sub-transaction P1 according to the first embodiment of the fulfillment module 311 is depicted in FIG. 8B. In the second and the third embodiments of the fulfillment module 311 may be substantially similar to the sequence diagram 800B.

Figure 8C:
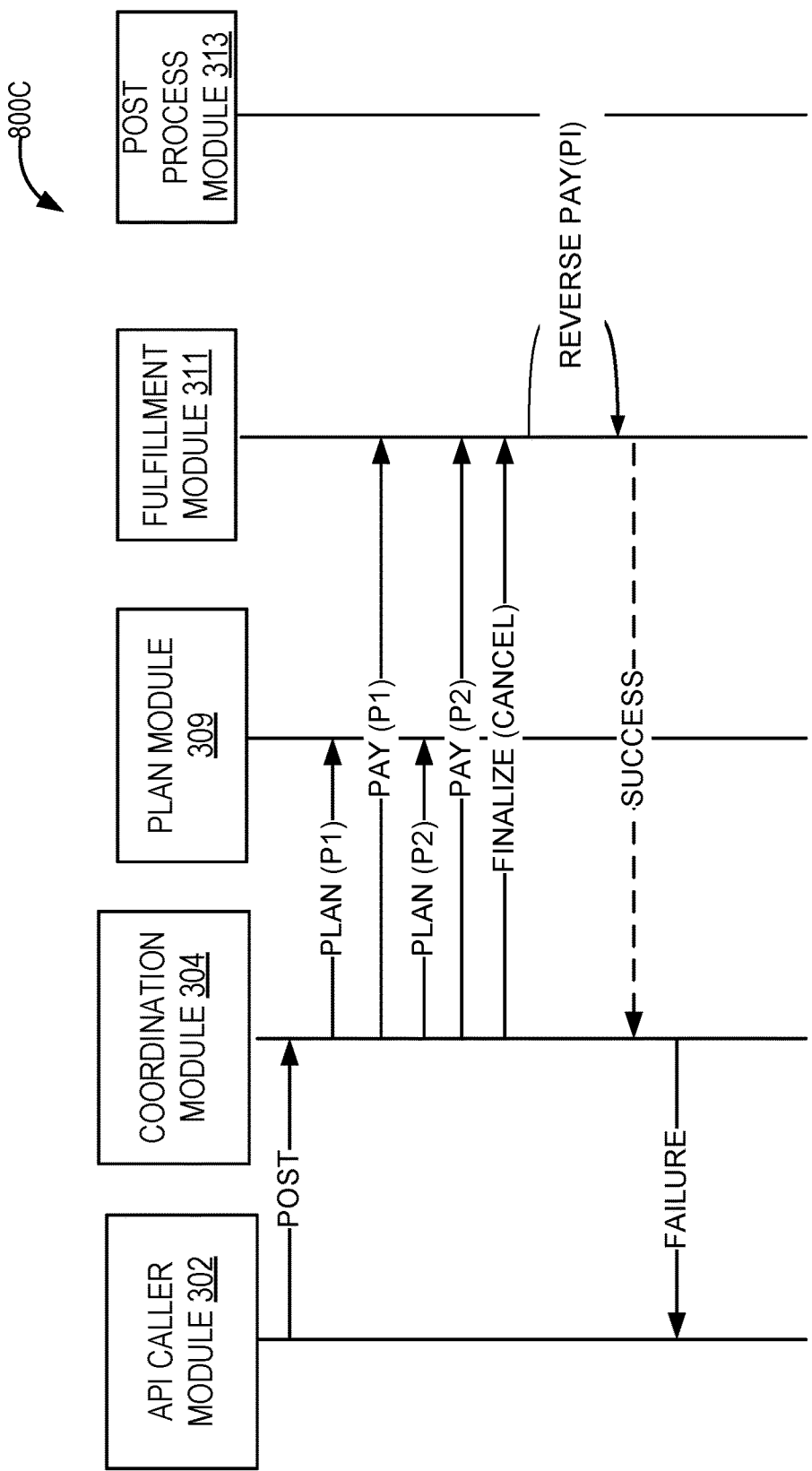
Figure 9B:
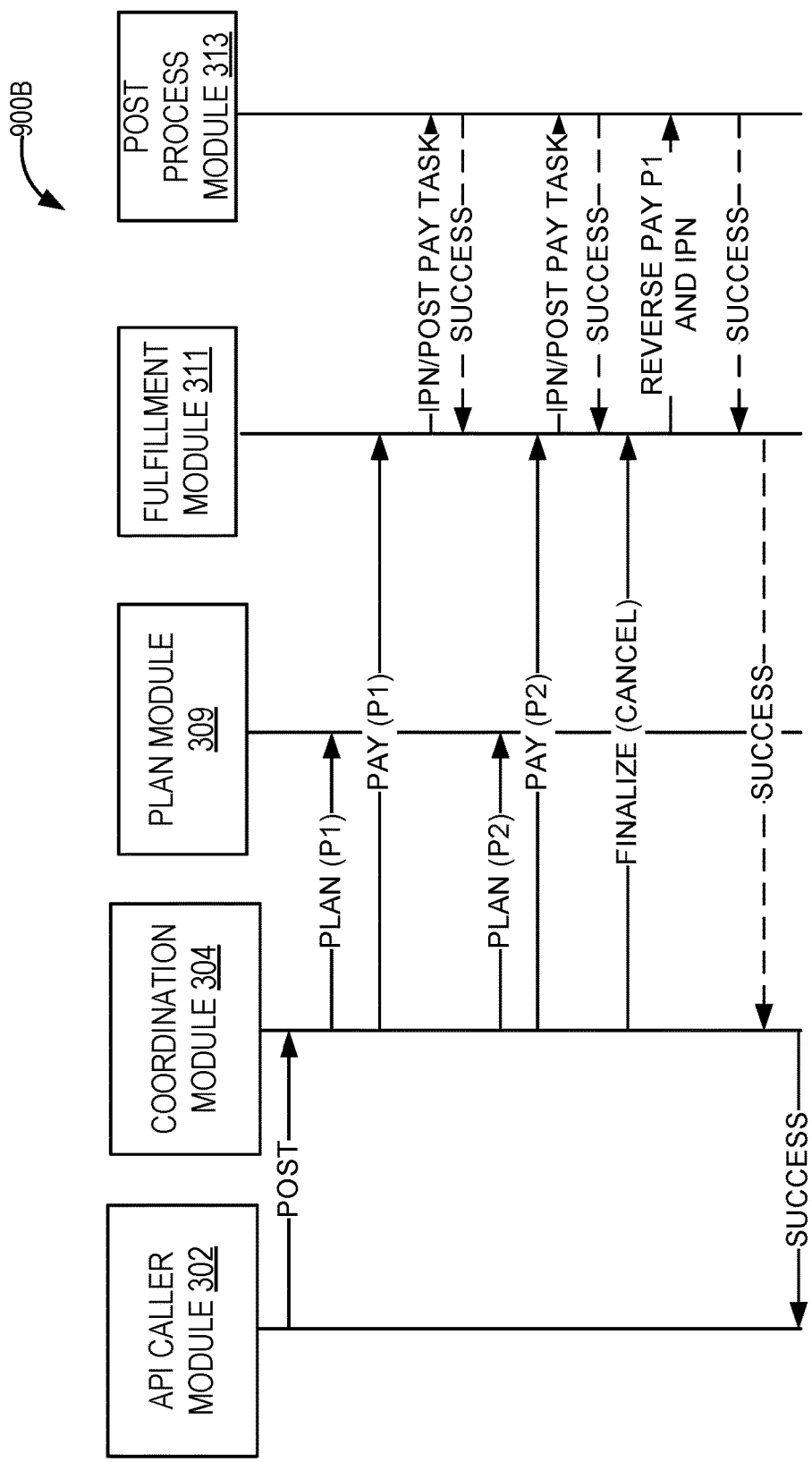
Figure 10B:
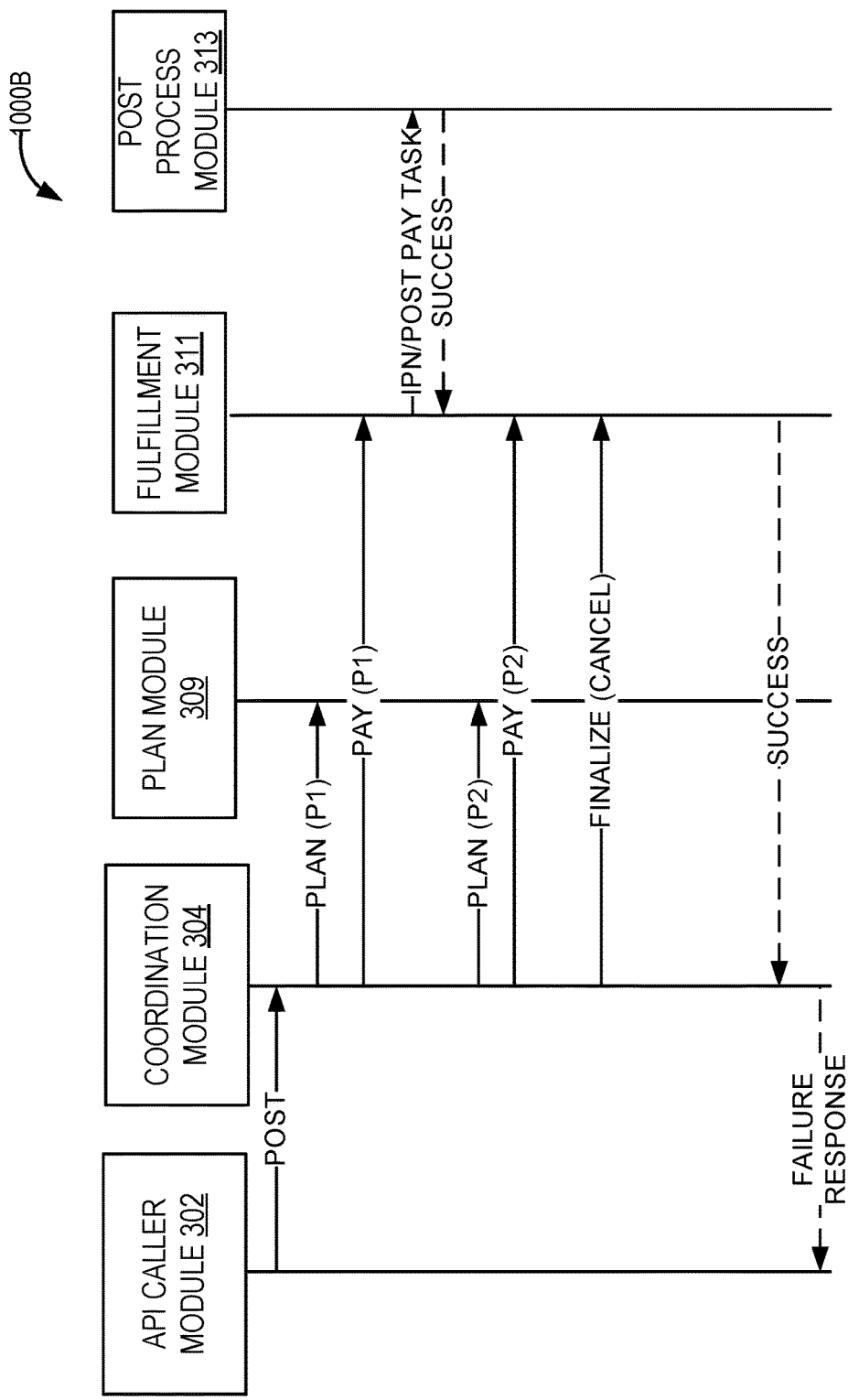
Figure 10C:
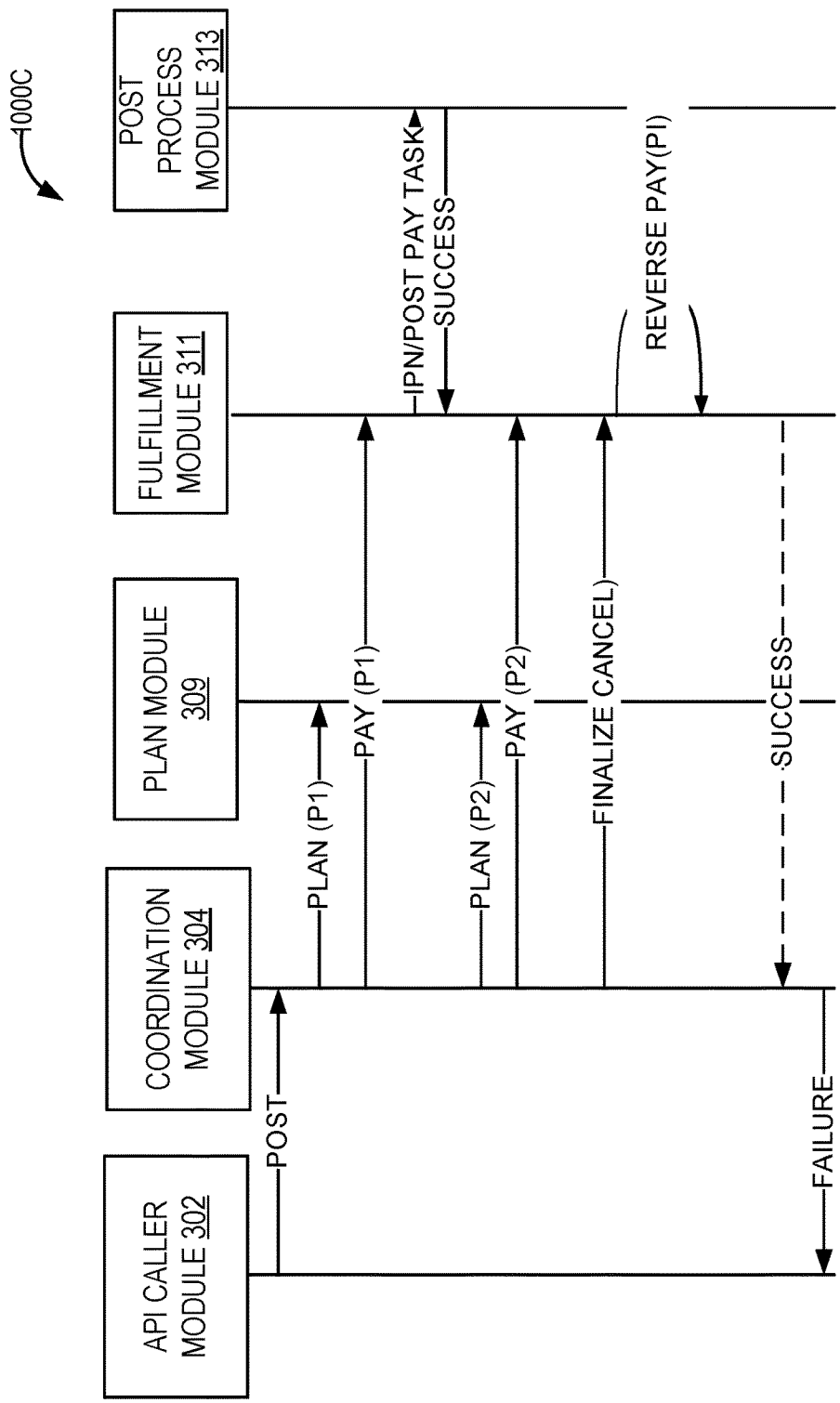

In response to the second sub-transaction P2 failing the risk assessments, the coordination module 304 generates a sub-transaction P2 authorization failure message that is included in the authorization results 305. The fulfillment module 311 may cancel the finalization and/or reverse fulfillment of the first sub-transaction P1. A sequence diagram 800C for the failure to authorize the second sub-transaction P2 according to the second embodiment of the fulfillment module 311 is depicted in FIG. 8C. A sequence diagram 900B for the failure to authorize the second sub-transaction P2 according to the second embodiment of the fulfillment module 311 is depicted in FIG. 9B. Sequence diagrams 1000B and 1000C for the failure to authorize the second sub-transaction P2 according to the third embodiment of the fulfillment module 311 are depicted in FIGS. 10B and 10C. In FIG. 10B, the IPN may be published following the fulfillment of the first sub-transaction P1. In FIG. 10C the IPN may be published following the fulfillment of the second sub-transaction P1.

Figure 8D:
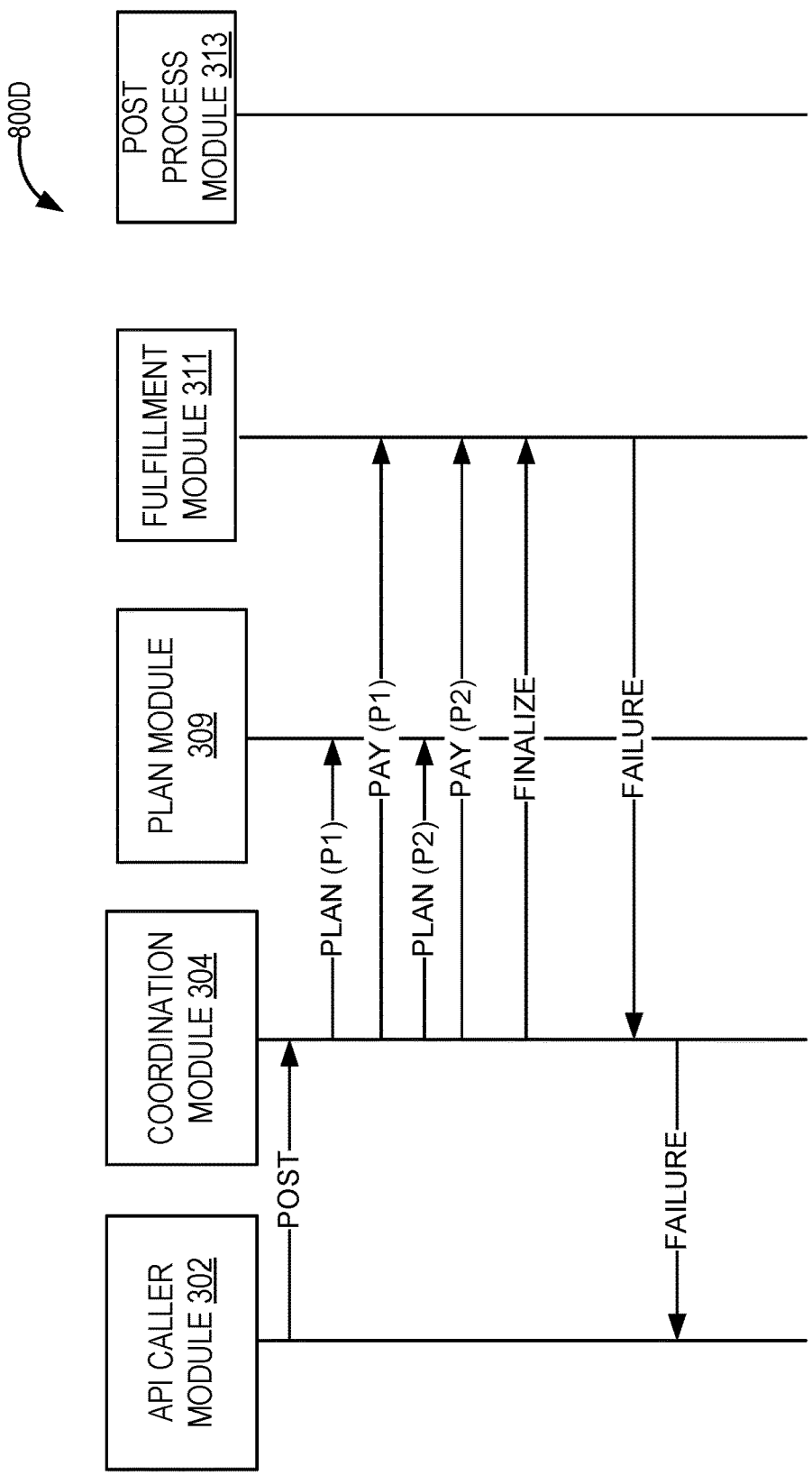
Figure 9C:
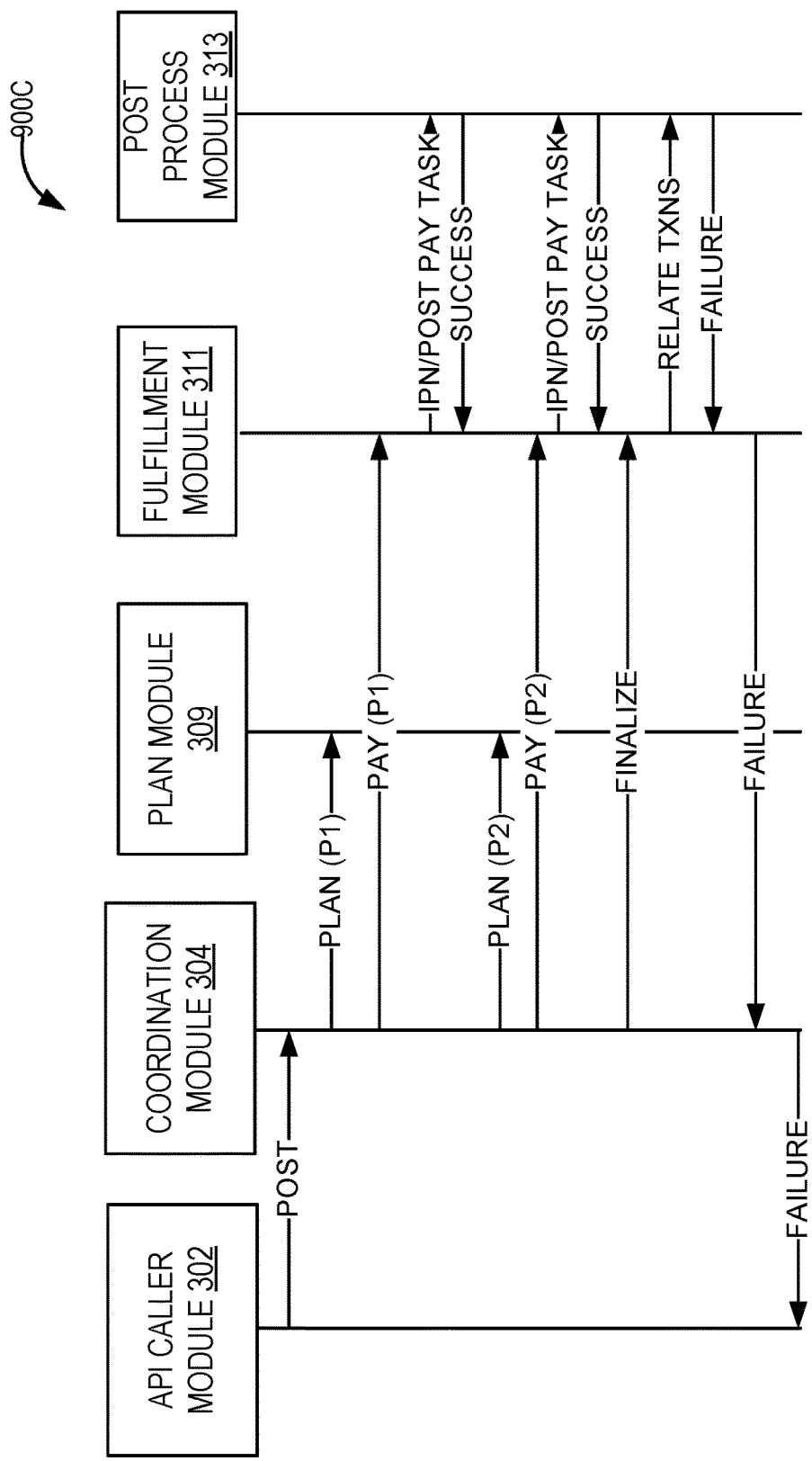
Figure 9D:
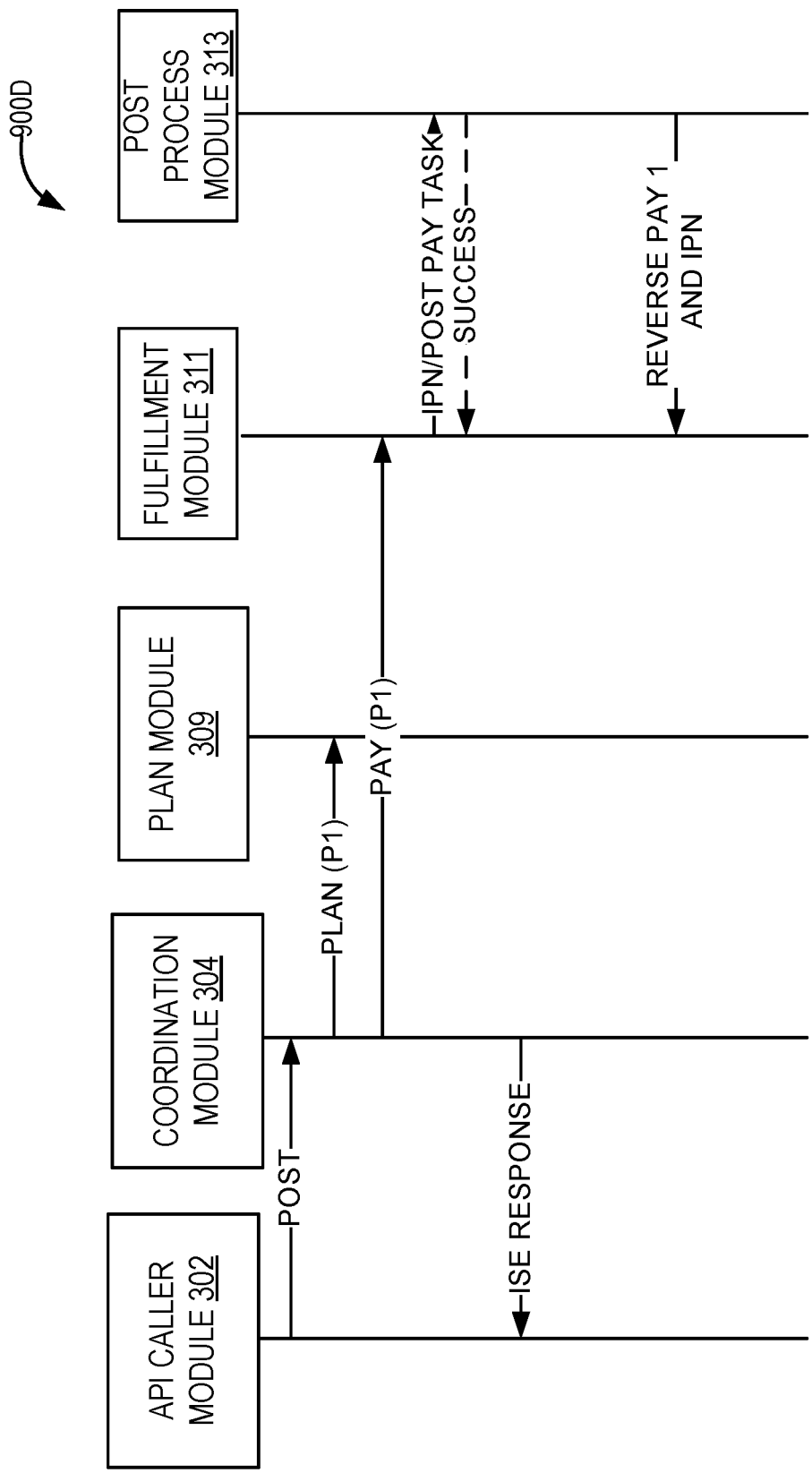
Figure 10D:
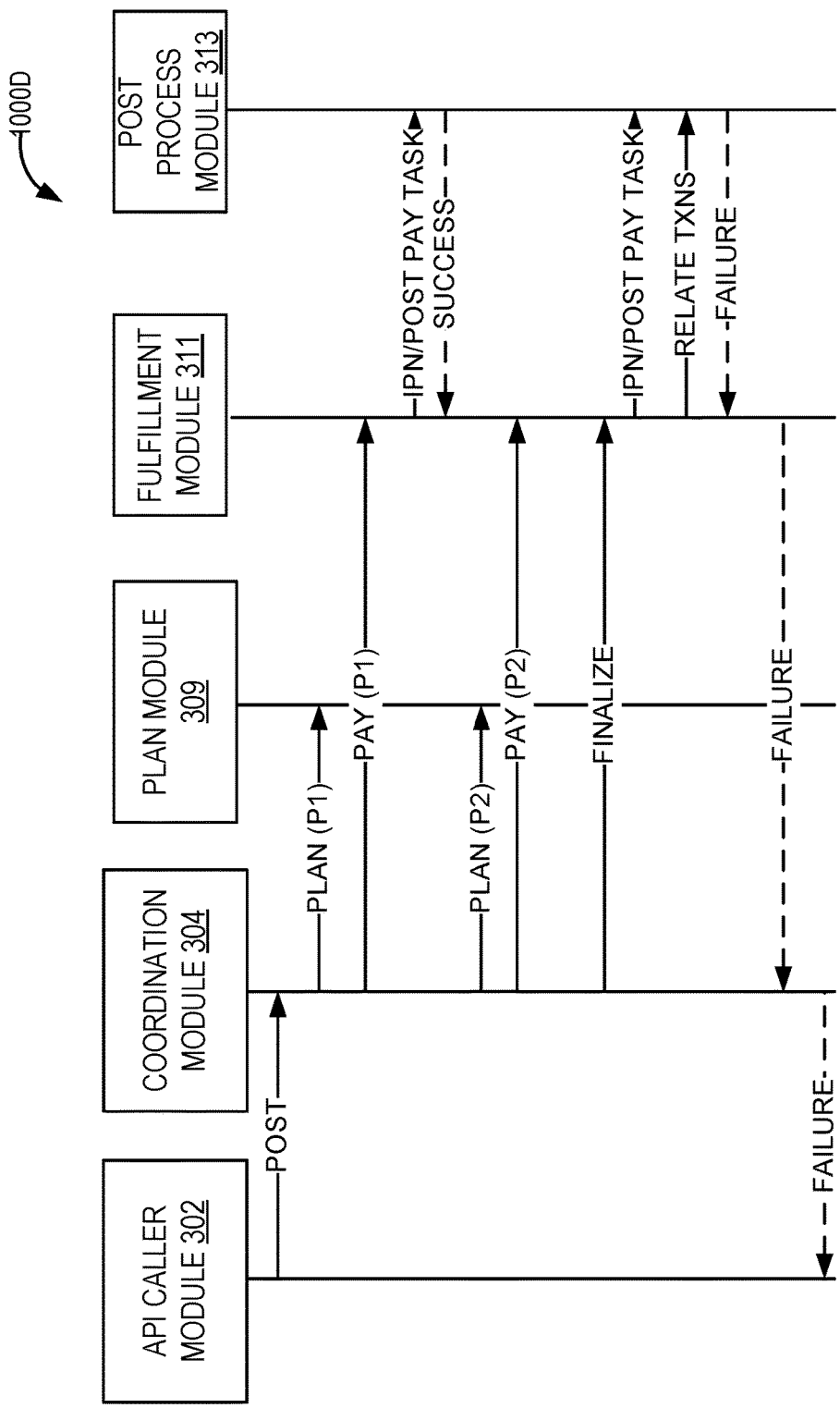

In response to the finalization failing, the fulfillment module 311 may communicate such failure to the coordination module 304, which generates a finalization failure message that is included in the authorization results 305. A sequence diagram 800D for the failure of finalization according to the first embodiment of the fulfillment module 311 is depicted in FIG. 8D. A sequence diagram 900C for the failure of finalization according to the second embodiment of the fulfillment module 311 is depicted in FIG. 9C. A sequence diagram 1000D for the failure of finalization according to the third embodiment of the fulfillment module 311 is depicted in FIG. 10D.

Figure 8E:
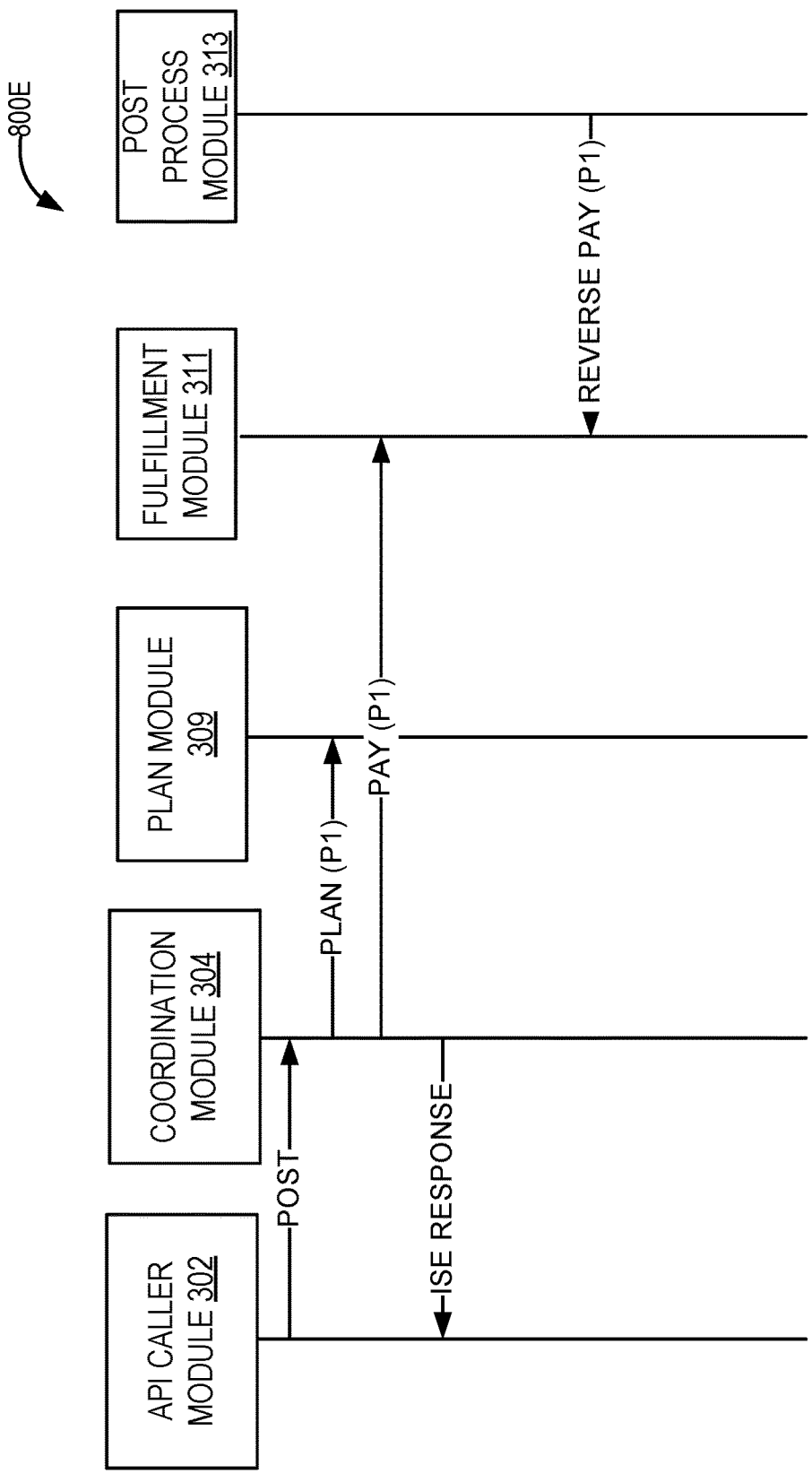

In response to failure of the coordination module 304 prior to finalization by the fulfillment module 311, a coordination failure module message (ISE Response) may be included in the authorization results 305. The merchant server 124 may retry, which may end in success or failure. If the merchant server 124 does not retry, any of the sub-transactions P1 and P2 that have been fulfilled are reversed. A sequence diagram 800E for failure of the coordination module 304 prior to finalization according to the first embodiment of the fulfillment module 311 is depicted in FIG. 8E. A sequence diagram 900D for failure of the coordination module 304 prior to finalization according to the second embodiment of the fulfillment module 311 is depicted in FIG. 9C.

Figure 8F:
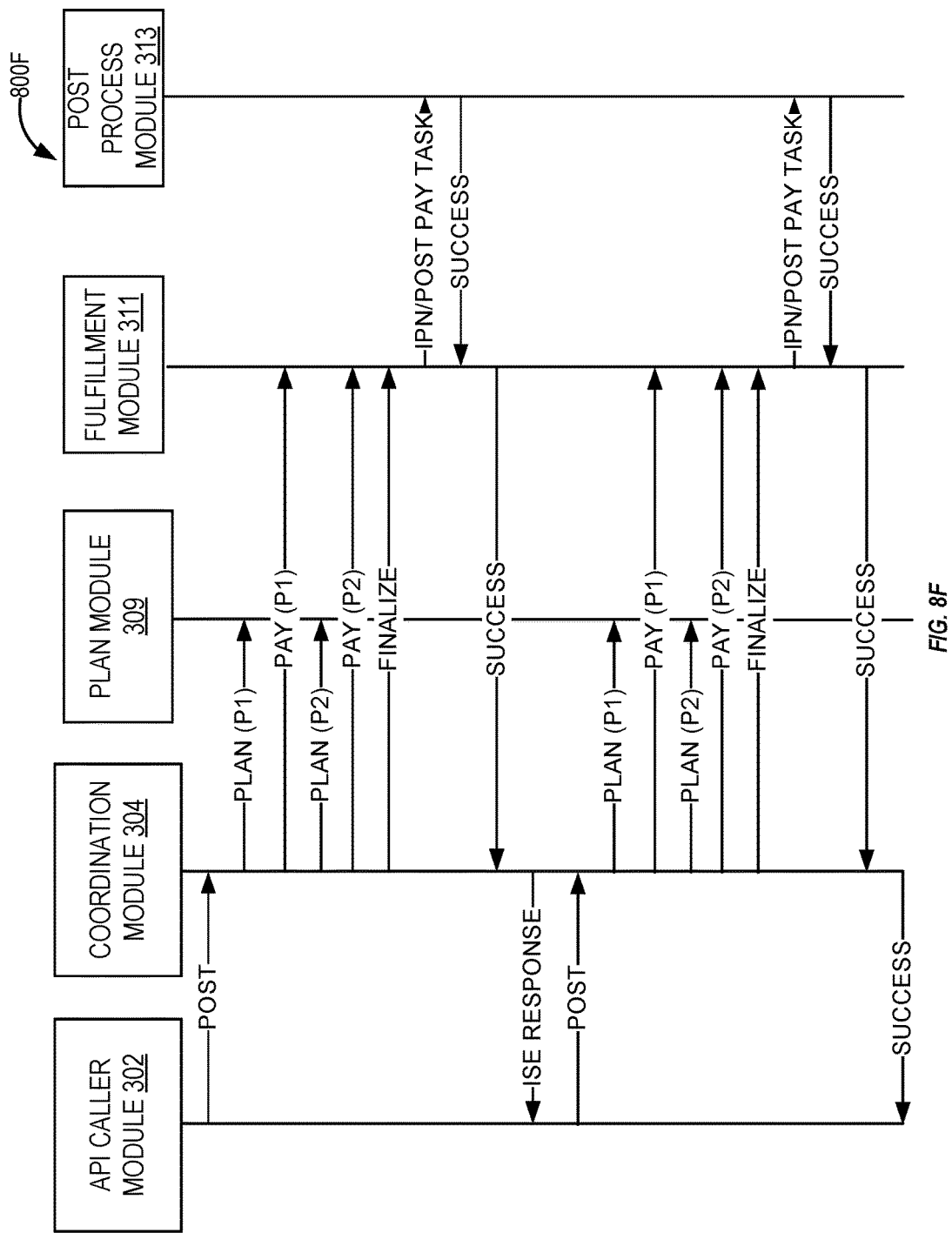
Figure 9E:
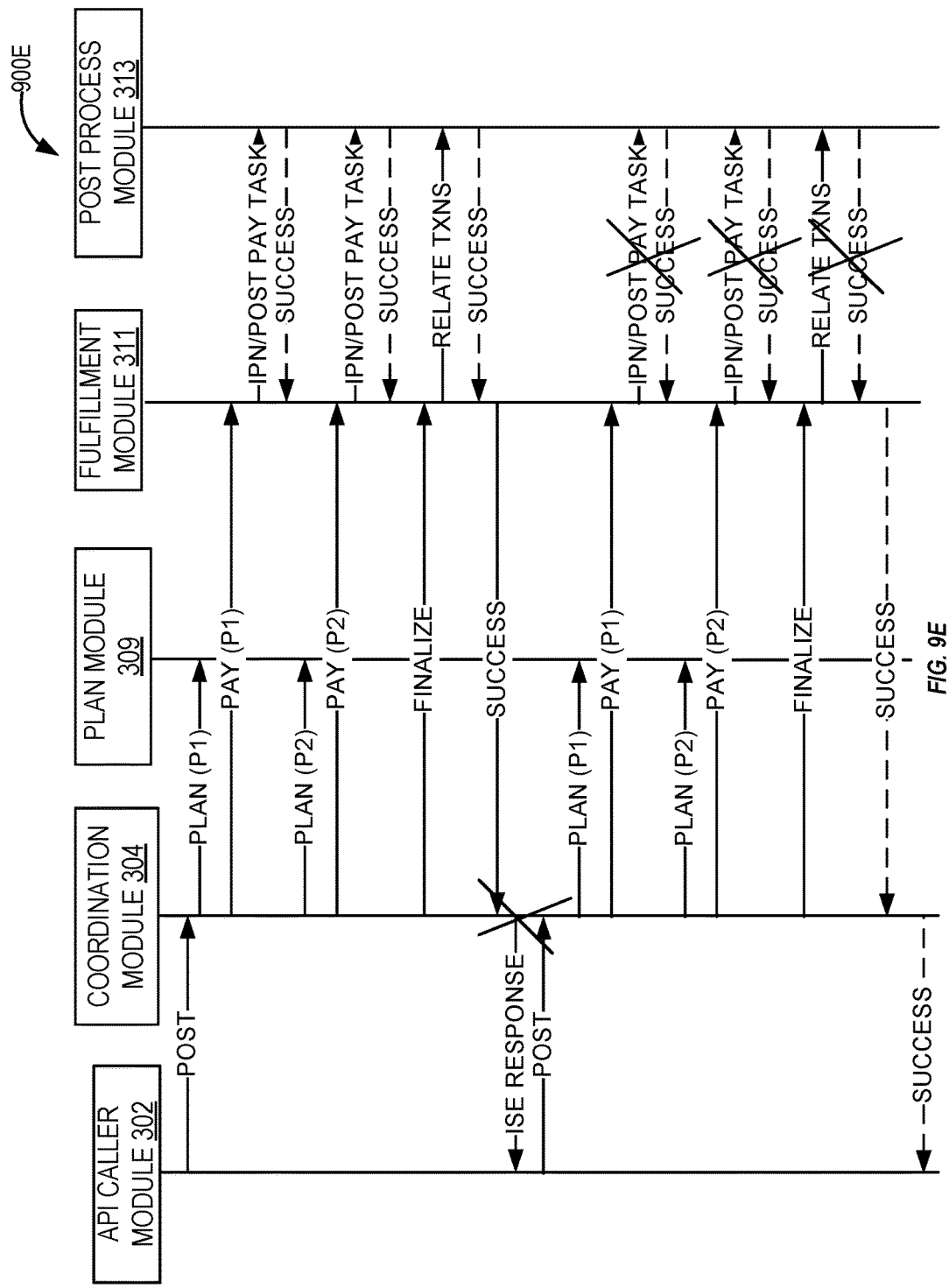
Figure 10E:
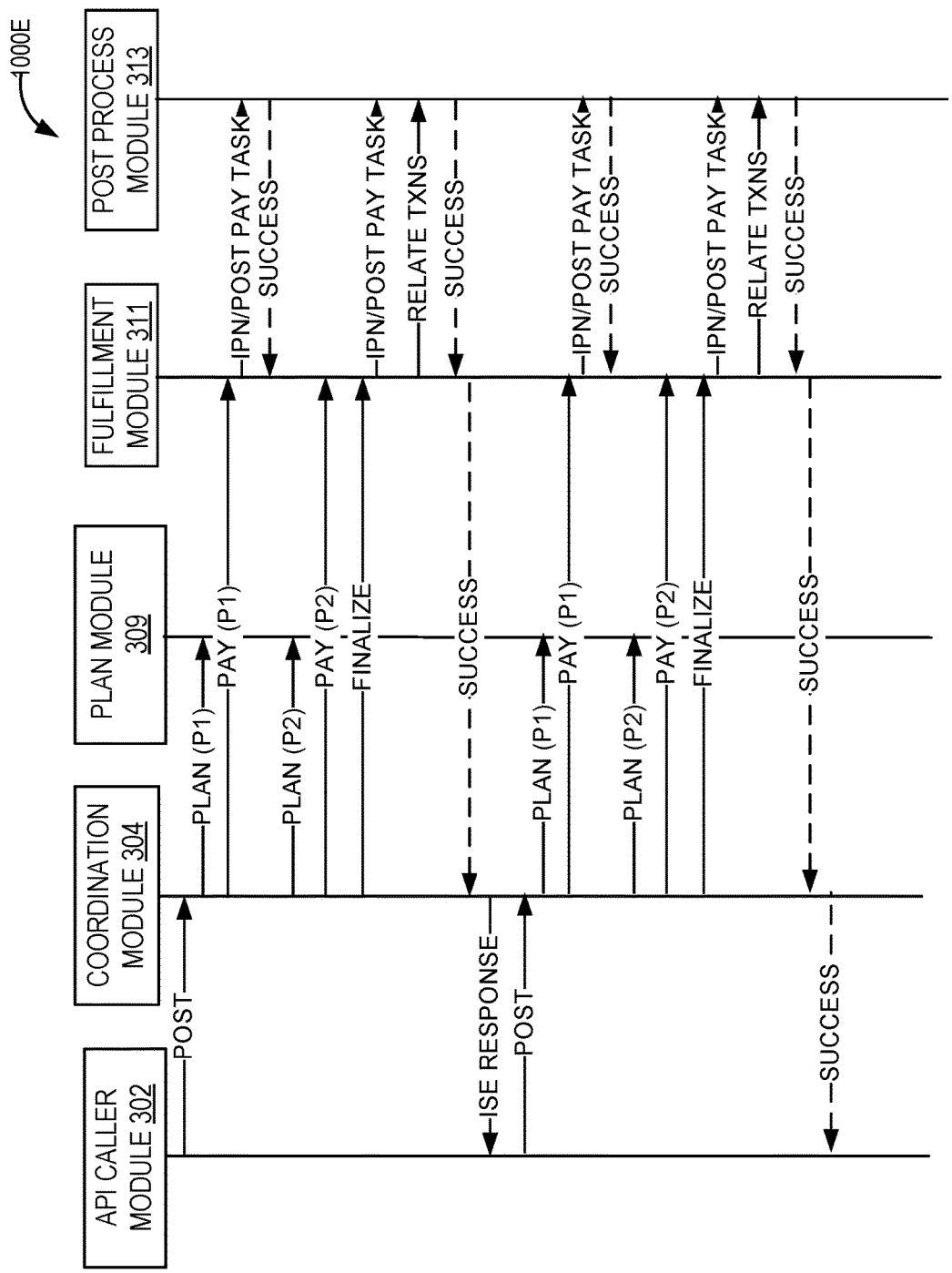

In response to failure of the coordination module 304 after finalization by the fulfillment module 311, a coordination failure module message may be included in the authorization results 305. The merchant server 124 may retry, which may end in success or failure. If the merchant server 124 does retry and the sub-transactions P1 and P2 are authorized, an authorization success message may be pulled as an idempotent response and included in the authorization results 305. A sequence diagram 800F for failure of the coordination module 304 after to finalization according to the first embodiment of the fulfillment module 311 is depicted in FIG. 8F. A sequence diagram 900E for failure of the coordination module 304 after to finalization according to the second embodiment of the fulfillment module 311 is depicted in FIG. 9E. A sequence diagram 1000E for failure of the coordination module 304 after to finalization according to the third embodiment of the fulfillment module 311 is depicted in FIG. 10E.

Figure 11A:
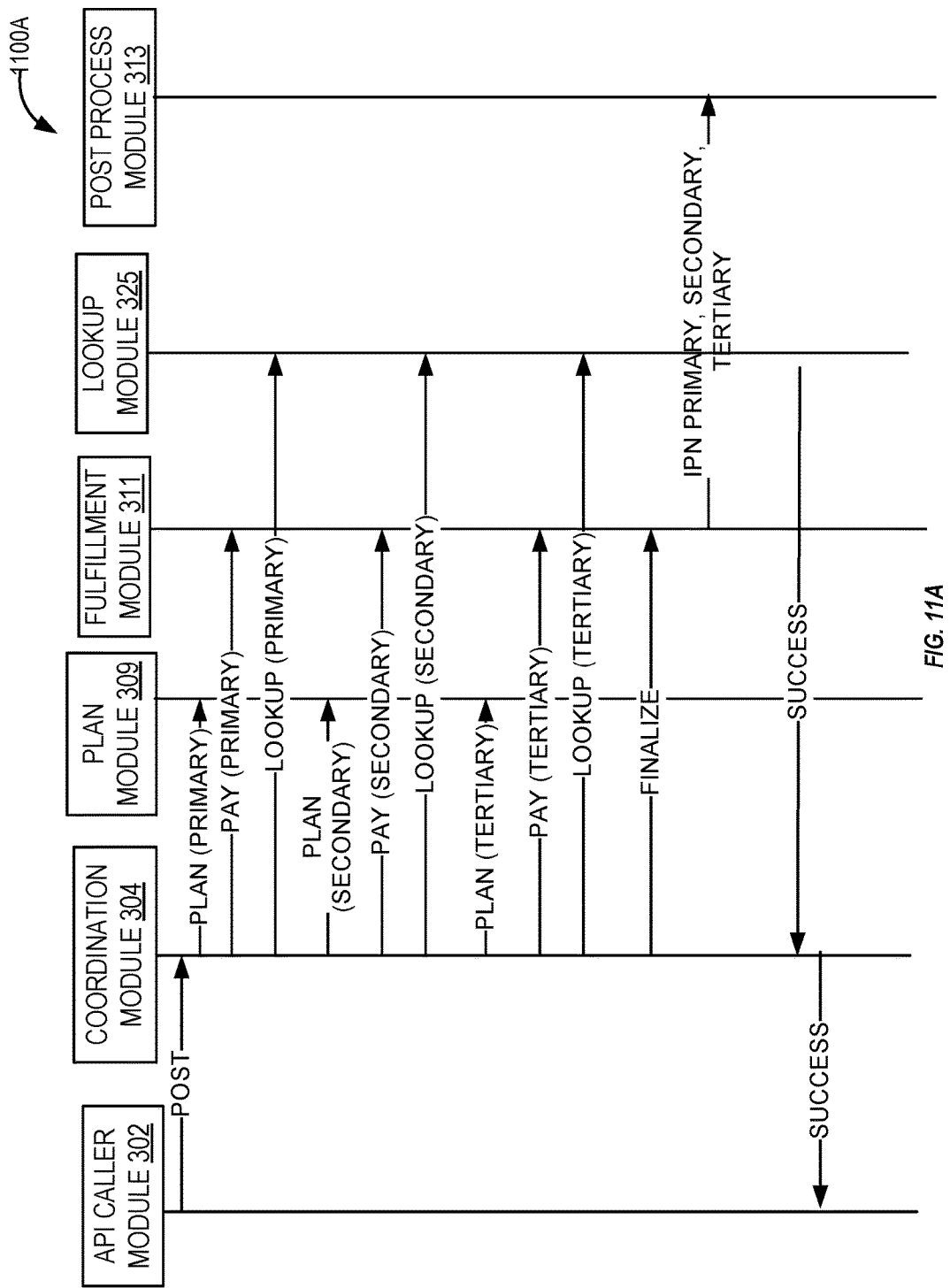
FIGS. 11A-11C are sequence diagrams represent authorization processes that may occur in the multi-leg transaction process of FIG. 3A.
Figure 11B:
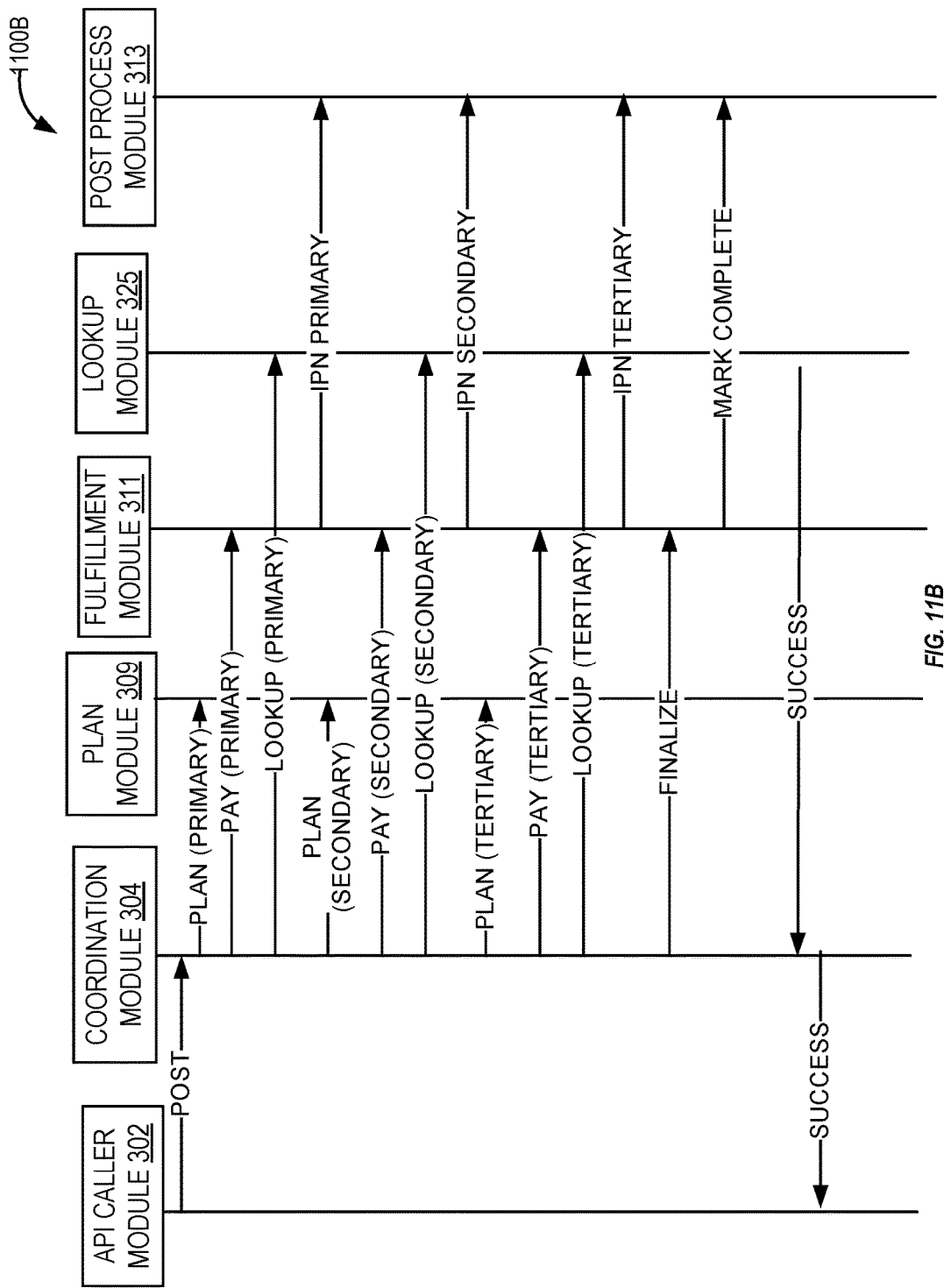
Figure 11C:
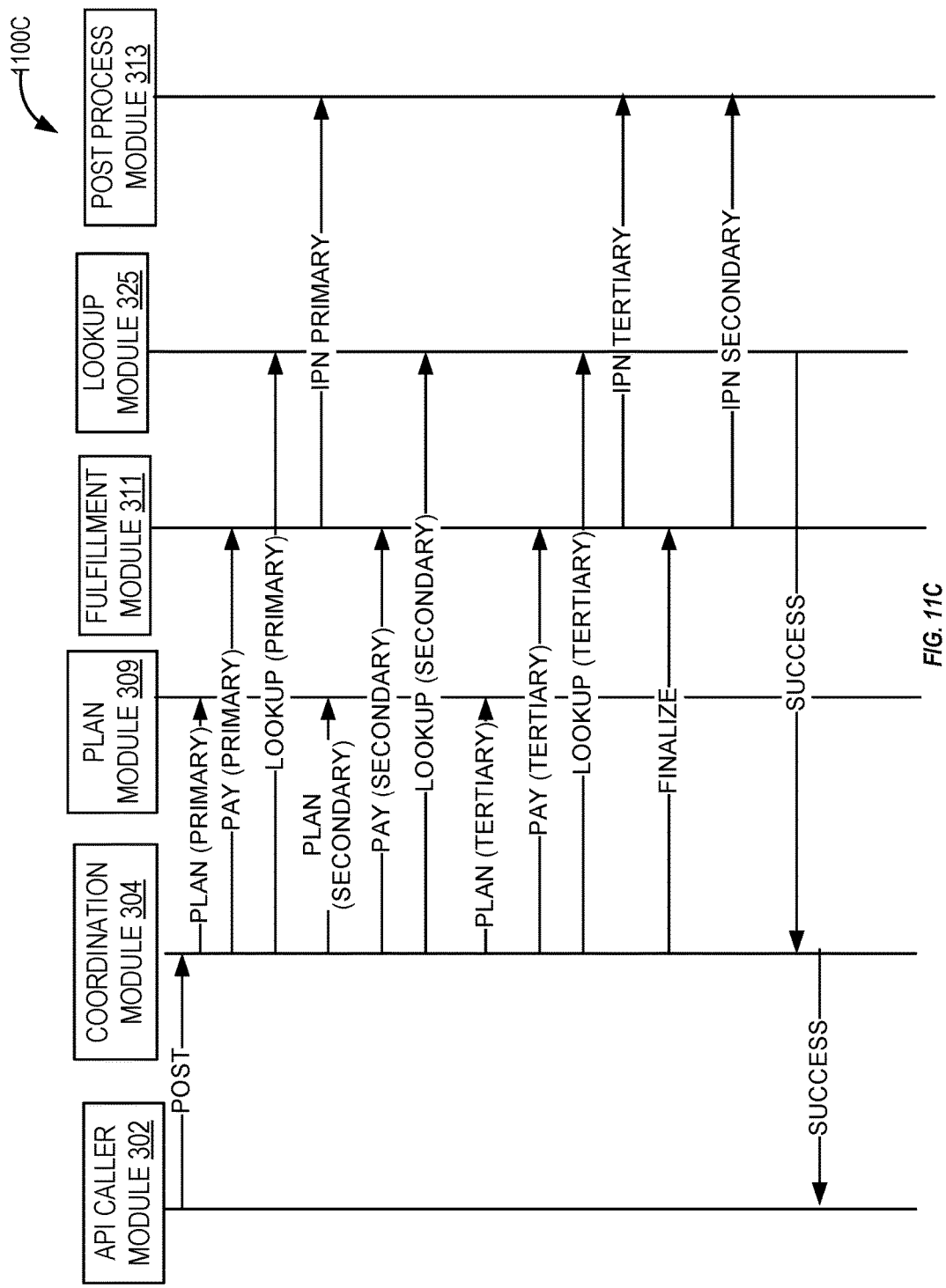

FIGS. 11A-11C depict sequence diagrams 1100A, 1100B, and 1100C. FIGS. 11A-11C include the API caller module 302, the coordination module 304, the plan module 309, the fulfillment module 311, the lookup module 325, and the post process module 313. FIGS. 11A-11C depict successful authorization of a chain payment in the financial transaction module 121A. FIG. 11A depicts successful authorization of a chain payment in the financial transaction module 121A according to the first embodiment of the fulfillment module 311. FIG. 11B depicts successful authorization of a chain payment in the financial transaction module 121A according to the second embodiment of the fulfillment module 311. FIG. 11C depicts successful authorization of a chain payment in the financial transaction module 121A according to the third embodiment of the fulfillment module 311. A chain payment may include a primary transfer to a primary entity (e.g., first vendor 116A) as a primary receiver. The chain payment then includes a second transfer of a second amount from the primary entity to a secondary entity (e.g., the second vendor 116B). The chain payment then includes a third transfer of a third amount from the secondary entity to a tertiary entity. In FIG. 11C, the IPN may be published following the fulfillment of the primary and tertiary sub-transactions and held following the fulfillment of the secondary sub-transaction. Failures in the chain payments depicted in FIGS. 11A-11C may result in similar operations to those described with reference to FIGS. 8A-10E.

In FIG. 3B, the financial transaction module 121B is configured to perform one risk assessments for all of the sub-transactions P1 and P2. In the financial transaction module 121B, the authorization module 306 may include the plan module 309, the fulfillment module 311, and the post process module 313. The financial transaction module 121B of FIG. 3B may include a lookup module 325 of FIG. 3A, but is omitted from FIG. 3B. The plan module 309 may be configured to perform the risk assessment for the sub-transactions P1 and P2 based on portions of the transaction information 301. The fulfillment module 311 may make arrangements to transfer funds or fulfill the sub-transactions P1 and P2 and communicate an IPN for the sub-transactions P1 and P2 to the post process module 313. The post process module 313 may perform post payment tasks and communicate a message indicating the authorization results 305 are successful.

In FIG. 3C, the financial transaction module 121C is configured to perform one risk assessment for each of the sub-transactions P1 and P2. In the financial transaction module 121C, the financial transaction module 121C may include multiple authorization modules 306. Each of the authorization modules 306 may be substantially similar to the authorization modules of the financial transaction module 121B and 121A, described above.

In FIG. 3D, the financial transaction module 121D is configured to authorize the sub-transactions P1 and P2. The financial transaction module 121D of FIG. 3D may implement an authorization process that may be implemented in response to the payment type selection including a credit card. In the financial transaction module 121D, the authorization module 306 may perform one or more captures of portions of a price of the multi-leg transaction. For example, the authorization module 306 may be configured to capture a first price of the first sub-transaction P1 and then subsequently perform a capture for a second price of the second sub-transaction P2. In some embodiments, the authorization module 306 may access information from the accounts 144 such as credit limit to ensure the buyer 102 is able to pay for the sub-transactions P1 and P2.

In FIG. 3E, the financial transaction module 121E is configured to authorize the sub-transactions P1 and P2 or portions thereof. The financial transaction module 121E of FIG. 3E may include an authorization process that may be implemented in response to the payment type selection including a gift card or another similar pre-paid card. In the financial transaction module 121E, the authorization module 306 may verify with a gift card issue company 310. For example, the authorization module 306 may be configured to access the gift card issue company 310 and verify a monetary value of the gift card.

As mentioned above, a single example of the financial transaction modules 121A-121E may be configured to perform multiple authorization processes described above. For example, the selected payment types may include a gift card and a remainder split between a credit card and an online money transfer system. In response, the authorization module 306 may verify a monetary value of the gift card, capture a first portion of the remainder, and perform a risk assessment on the second portion of the remainder.

Figure 5:
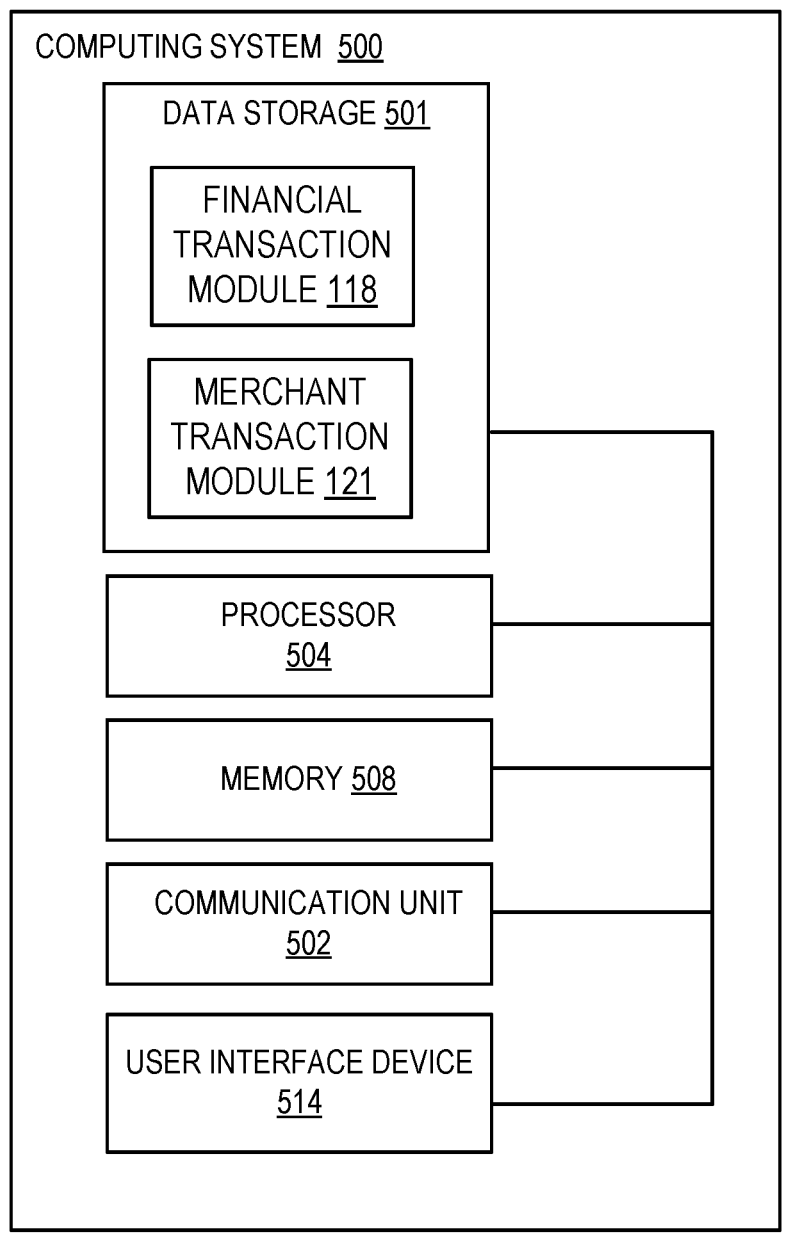
FIG. 5 is a block diagram of an example computing system configured for multi-leg transaction processing.

FIG. 5 illustrates an example computing system 500 configured for multi-leg processing. The computing system 500 may be implemented in the operating environment 100 of FIG. 1. Examples of the computing system 500 may include one or more of the merchant server 124, the buyer device 110, the vendor device 104, and the financial server 128, the third party or government server 131. The computing system 500 may include one or more processors 504, a memory 508, a communication unit 502, a user interface device 514, and a data storage 501 that includes one or more of the financial transaction module 121 and/or the merchant transaction module 118 (collectively, modules 121/118).

The processor 504 may include any suitable special-purpose or general-purpose computer, computing entity, or processing device including various computer hardware or software modules and may be configured to execute instructions stored on any applicable computer-readable storage media. For example, the processor 504 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 5, the processor 504 may more generally include any number of processors configured to perform individually or collectively any number of operations described in the present disclosure. Additionally, one or more of the processors 504 may be present on one or more different electronic devices or computing systems. In some embodiments, the processor 504 may interpret and/or execute program instructions and/or process data stored in the memory 508, the data storage 501, or the memory 508 and the data storage 501. In some embodiments, the processor 504 may fetch program instructions from the data storage 501 and load the program instructions in the memory 508. After the program instructions are loaded into the memory 508, the processor 504 may execute the program instructions.

The memory 508 and the data storage 501 may include computer-readable storage media for carrying or having computer-executable instructions or data structures stored thereon. Such computer-readable storage media may include any available media that may be accessed by a general-purpose or special-purpose computer, such as the processor 504. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 504 to perform a certain operation or group of operations.

The communication unit 502 may include one or more pieces of hardware configured to receive and send communications. In some embodiments, the communication unit 502 may include one or more of an antenna, a wired port, and modulation/demodulation hardware, among other communication hardware devices. In particular, the communication unit 502 may be configured to receive a communication from outside the computing system 500 and to present the communication to the processor 504 or to send a communication from the processor 504 to another device or network.

The user interface device 514 may include one or more pieces of hardware configured to receive input from and/or provide output to a user. In some embodiments, the user interface device 514 may include one or more of a speaker, a microphone, a display, a keyboard, a touch screen, or a holographic projection, among other hardware devices. In these and other embodiments, the user interface device 514 may be configured to receive input from a buyer (e.g., 102) or a vendor (e.g., 116), for example.

The modules 118/121 may include program instructions stored in the data storage 501. The processor 504 may be configured to load the modules 118/121 into the memory 508 and execute the modules 118/121. Alternatively, the processor 504 may execute the modules 118/121 line-by-line from the data storage 501 without loading them into the memory 508. When executing the modules 118/121 the processor 504 may be configured to process a multi-leg transaction as described elsewhere in this disclosure.

Modifications, additions, or omissions may be made to the computing system 500 without departing from the scope of the present disclosure. For example, in some embodiments, the computing system 500 may not include the user interface device 514. In some embodiments, the different components of the computing system 500 may be physically separate and may be communicatively coupled via any suitable mechanism. For example, the data storage 501 may be part of a storage device that is separate from a server, which includes the processor 504, the memory 508, and the communication unit 502, that is communicatively coupled to the storage device.

Figure 6:
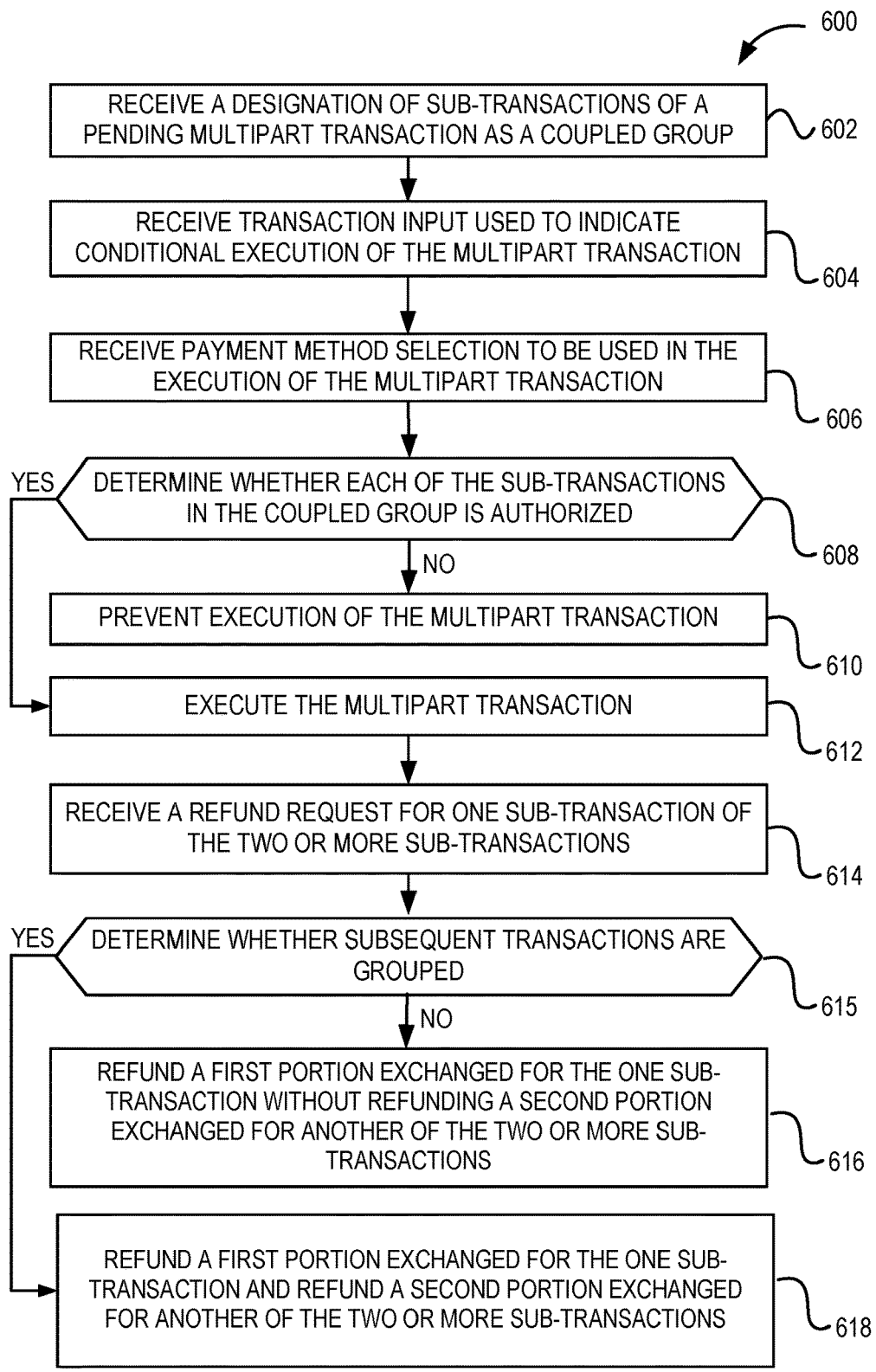
FIG. 6 is a flowchart of an example method of multi-leg transaction processing.

FIG. 6 is a flow diagram of an example method 600 of multi-leg transaction processing according to an embodiment described in this disclosure. The method 600 may be implemented, in some embodiments, by a computing device or computing system, such as the financial server 128, the merchant server 124, or the vendor device 104 discussed elsewhere in this disclosure or the computing system 500 discussed with reference to FIG. 5. In some embodiments, the financial server 128, the merchant server 124, the vendor device 104, or the computing system 500 may include or may be communicatively coupled to a non-transitory computer-readable medium (e.g., the memory 508 of FIG. 5) having stored thereon programming code or instructions (e.g., the modules 118/121 of FIG. 5) that are executable by a processor (such as the processor 504 of FIG. 5) to cause the financial server 128, the merchant server 124, the vendor device 104, or the computing system 500 to perform the method 600. Additionally or alternatively, the financial server 128, the merchant server 124, the vendor device 104, or the computing system 500 may include the processor 504 described above that is configured to execute computer instructions to cause the financial server 128, the merchant server 124, the vendor device 104, or the computing system 500 or another computing device to perform the method 600. Although illustrated as discrete blocks, various blocks may be divided into additional blocks, combined into fewer blocks, or eliminated, depending on the desired implementation.

The method 600 of FIG. 6 may begin at block 602 in which a designation is received. The designation may indicate that two or more sub-transactions of a pending multi-leg transaction are a coupled group. The designation may be received from a merchant server such as the merchant server 124 of FIG. 1. In a coupled group, execution of any of the sub-transactions is dependent on prior authorization of each of the two or more sub-transactions. In some embodiments, the sub-transactions of the coupled group include a first sub-transaction with a first vendor and a second sub-transaction at a second vendor. Additionally or alternatively, the sub-transactions of the coupled group include a product sub-transaction and an incidental sub-transaction that is related to the product sub-transaction.

At block 604, transaction input may be received. The transaction input may be used to indicate conditional execution of the multi-leg transaction. In some embodiments, the transaction input may be communicated from a buyer device such as the buyer device 110 to a merchant server such as the merchant server 124 of FIG. 1. An example of the transaction input may include a selection of an icon on a website hosted by a merchant that indicates a buyer desires execution of the multi-leg transaction.

At block 606, payment type selection may be received. The payment type selection may indicate a payment type to be used in the execution of the multi-leg transaction. For example, the payment type may include a credit card, debit card, gift card, cash card, bank transfer, an online money transfer system, another payment type, or some combination thereof.

At block 608, it may be determined whether each of the two or more sub-transactions in the coupled group is authorized. In some embodiments described in this disclosure, the determination may be conducted prior to execution of the multi-leg transaction and in substantially real time. For example, the determination may be performed following receipt of the transaction input and prior to execution of the multi-leg transaction. Accordingly, the execution of the multi-leg transaction may not occur unless the two or more sub-transactions are all authorized.

In these and other embodiments the determination may include parsing the transaction information for the portions used in the determination. Additionally, the determination may include inputting the portions of the transaction information into one or more authorization processes that ensure a buyer has sufficient funds to complete each of the sub-transactions. The authorization process used in the determination may be based on the payment type selection.

In some embodiments, the authorization process may include one or more captures of portions of a price of the multi-leg transaction in response to the payment type selection including a credit card. Additionally or alternatively, the authorization process includes verifying a gift card issue company a monetary value of the gift card in response to the payment type selection including a gift card. Additionally or alternatively still, the authorization process may include performing one or more risk assessments on the sub-transactions in the coupled group in response to the payment type selection including use of an online money transfer system. In these and other embodiments, the risk assessments may include multiple risk assessments performed for each of the two or more sub-transactions and/or a single risk assessment on the two or more sub-transactions together.

In response to any of the sub-transactions being unauthorized ("NO" at block 608), the method 600 may proceed to block 610. At block 610, execution of the multi-leg transaction may be prevented. For example, the multi-leg transaction may fail. In some embodiments, the vendors (e.g., vendors 116A and 116B of FIG. 1) may not know that the multi-leg transaction has ever been pending or was pending. Additionally, the buyer (e.g., the buyer 102 of FIG. 1) may see an execution failure in substantially real time and during execution of the multi-leg transaction.

In response to authorization of each of the two or more sub-transactions ("YES" at block 608), the method 600 may proceed to block 612. At block 612, the multi-leg transaction may be executed. In some embodiments, the multi-leg transaction may be executed non-sequentially. For instance, execution of the sub-transactions of multi-leg transaction may occur simultaneously or substantially simultaneously.

At block 614, a refund request may be received for one sub-transaction of the sub-transactions. The refund request may be received following execution of the multi-leg transaction. At block 615, it may be determined whether subsequent transactions are grouped. Whether the subsequent transactions are grouped or ungrouped may be based on payment type, a preference or selection of a merchant and/or vendor(s) 116, a default setting of a merchant and/or vendor(s), processing overhead involved in cascading the subsequent transactions, type of subsequent transaction, type of multi-leg transaction, other factors, or some combination thereof. For instance, an example multi-leg transaction that includes a product purchase and a custom fee may remain grouped because a subsequent transaction regarding the product purchase inherently frustrates the custom fee. In contrast, another multi-leg transaction may include airline tickets and a hotel reservation. An upgrade of the airline ticket from economy class to first class does not frustrate the hotel reservation.

In response to subsequent transactions being grouped ("YES" at block 614), the method 600 may proceed to block 618. At block 618, a first portion exchanged for the one transaction may be refunded and a second portion exchanged from another of the sub-transactions may be refunded. In response to subsequent transactions being ungrouped ("NO" at block 614), the method 600 may proceed to block 616. At block 616, in response to the refund request, at block 616 a first portion exchanged for the one transaction may be refunded without refunding a second portion exchanged for another of the sub-transactions.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
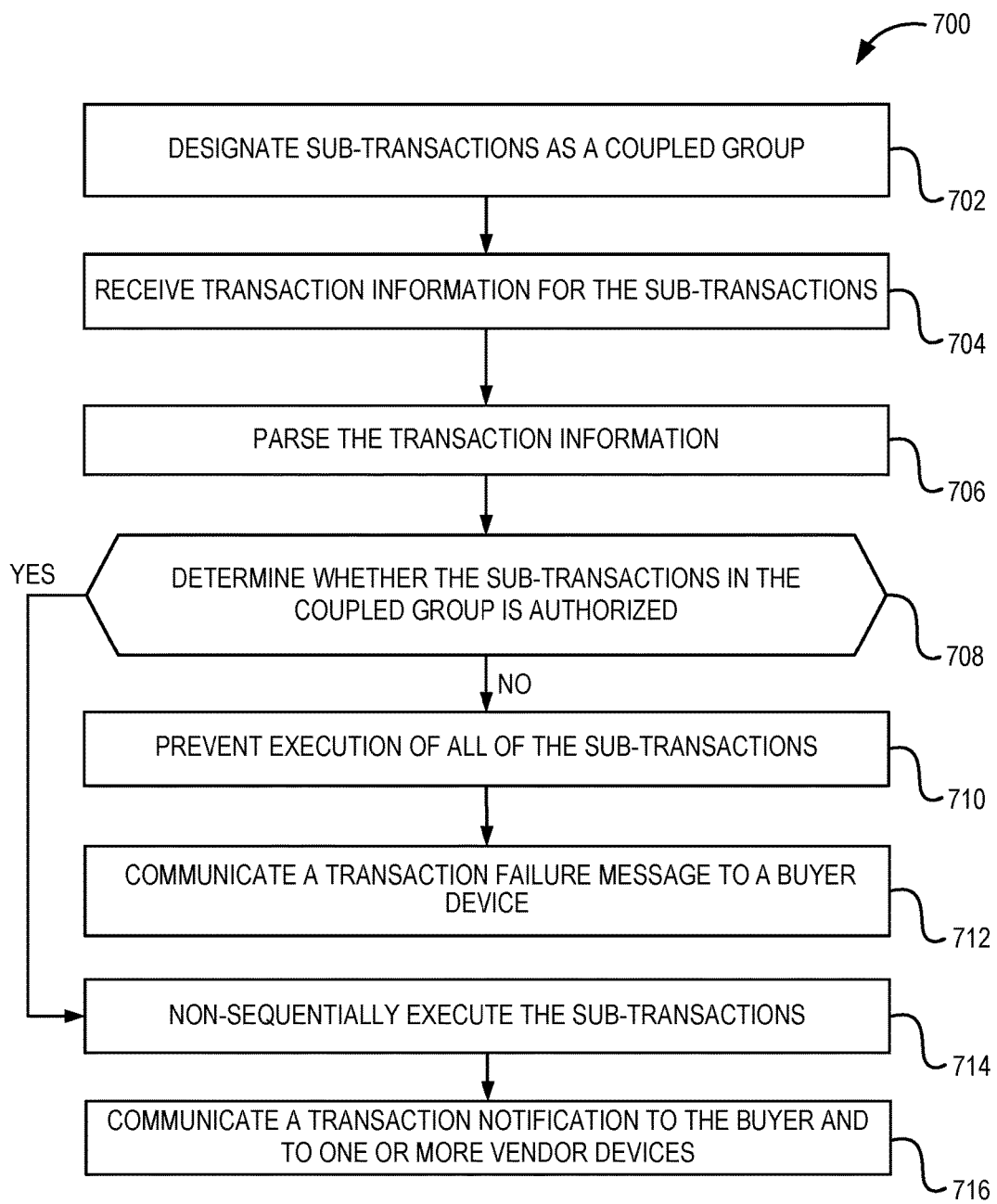
FIG. 7 is a flowchart of another example method of multi-leg transaction processing.

FIG. 7 is a flow diagram of an example method 700 of multi-leg transaction execution according to an embodiment described in this disclosure. The method 700 may be implemented, in some embodiments, by a computing device or computing system, such as the financial server 128, the merchant server 124, or the vendor device 104 discussed elsewhere in this disclosure or the computing system 500 discussed with reference to FIG. 5. In some embodiments, the financial server 128, the merchant server 124, the vendor device 104, or the computing system 500 may include or may be communicatively coupled to a non-transitory computer-readable medium (e.g., the memory 508 of FIG. 5) having stored thereon programming code or instructions (e.g., the modules 118/121 of FIG. 5) that are executable by a processor (such as the processor 504 of FIG. 5) to cause the financial server 128, the merchant server 124, the vendor device 104, or the computing system 500 to perform the method 700. Additionally or alternatively, the financial server 128, the merchant server 124, the vendor device 104, or the computing system 500 may include the processor 504 described above that is configured to execute computer instructions to cause the financial server 128, the merchant server 124, the vendor device 104, or the computing system 500 or another computing device to perform the method 700. Although illustrated as discrete blocks, various blocks may be divided into additional blocks, combined into fewer blocks, or eliminated, depending on the desired implementation.

One or more of the blocks 702, 704, 706, 708, 710, 712, 714, and 716 may be performed in substantially real time and prior to execution of a multi-leg transaction that includes two or more sub-transactions. The method 700 may begin at block 702 in which two or more sub-transactions may be designated as a coupled group. At block 704, transaction information for each of the sub-transactions may be received. The transaction information may include one or more selected payment types to be used in execution of the multi-leg transaction. In some embodiments, the transaction information includes one or more transaction information types selected from a group of transaction information including: a type of incidental transaction, a type of product, a vendor identity, a payment type, a payment account, a transaction identifier, a buyer identity, a third party identity, a government entity identity, a service fee for a service performed by a third party, or some combination thereof.

At block 706, the transaction information may be parsed. For example, the transaction information may be parsed for the selected payment types and other portions of the transaction information. At block 708, it may be determined whether each of the sub-transactions in the coupled group is authorized. Authorization determinations may be based at least partially on the selected payment types and the parsed portions of the transaction information.

In some embodiments, the determining includes generating a list of the sub-transactions and generating a list of authorized sub-transactions that includes each of the sub-transactions that are authorized. The list of the two or more sub-transactions may be compared with the list of authorized sub-transactions. In some embodiments, the determining includes inputting the portions of the transaction information into one or more authorization processes that ensure a buyer has sufficient funds to complete each of the two or more sub-transactions.

In response to any of the sub-transactions being unauthorized ("NO" at block 708), the method 700 may proceed to block 710. At block 710, execution of all of the sub-transactions may be prevented. At block 712, a transaction failure message may be communicated to a buyer device. In response to the sub-transactions being authorized ("YES" at block 708), the method 700 may proceed to block 714. At block 714, the sub-transactions may be non-sequentially executed. At block 716, a transaction notification may be communicated to the buyer and/or to one or more vendor devices.

In some embodiments, the authorization processes may include one or more captures of portions of a price of the multi-leg transaction in response to the payment type selection including a credit card. Additionally, the authorization processes may include performing one or more risk assessments on the two or more sub-transactions in the coupled group in response to the payment type selection including use of an online money transfer system. Additionally, the authorization processes may include verifying a gift card issue company a monetary value of the gift card in response to the payment type selection including a gift card.

In some embodiments the two or more sub-transactions of the coupled group include one or both of a first sub-transaction with a first vendor and a second sub-transaction at a second vendor and a product sub-transaction and an incidental sub-transaction that is related to the product sub-transaction.

In some embodiments, another input sample may be received for recognition of another particular input that suggests the occurrence of another monitored event. The general input may be compared to the other input sample. In response to a relationship between the general input and the other input sample being above a particular threshold, it may be determined that the general input includes the other particular input and an event message may be communicated that indicates the occurrence of the other monitored event.

As indicated above, the embodiments described herein may include the use of a special purpose or general purpose computer (e.g., the processor 504 of FIG. 5) including various computer hardware or software modules, as discussed in greater detail below. Further, as indicated above, embodiments described herein may be implemented using computer-readable media (e.g., the memory 508 of FIG. 5) for carrying or having computer-executable instructions or data structures stored thereon.

As used herein, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of multi-leg transaction execution to reduce transaction execution failure, the method comprising: following placement of an item in an electronic transaction interface hosted by an interface server, receiving, at a processing server from the interface server, a designation of a transaction including the item as a multi-leg transaction that includes two or more sub-transactions that are a coupled group, wherein the two or more sub-transactions are configured to be executed sequentially and failure in execution of any one of the two or more sub-transactions prevents execution of remaining sub-transactions of the coupled group;

submitting, by the processing server, an application program interface (API) call to the interface server, the API call being configured to call transaction information that includes transaction details of at least one of the two or more sub-transactions of the coupled group;

receiving, by the processing server, a transaction input used to indicate conditional execution of the multi-leg transaction, the transaction input being received responsive to selection of an icon on the electronic transaction interface;

responsive to the transaction input and prior to execution of the multi-leg transaction including the item:
  parsing, by the processing server, the transaction information for a portion used in authorization determinations; and
  based at least partially on the parsed transaction information, determining, by the processing server, whether each of the two or more sub-transactions in the coupled group is authorized;

in response to a prior sub-transaction of the two or more sub-transactions being authorized and a subsequent sub-transaction of the two or more sub-transactions being unauthorized:
  preventing, by the processing server, execution of all of the two or more sub-transactions of the multi-leg transaction such that the multi-leg transaction is cancelled prior to execution of the authorized prior sub-transaction; and
  delaying, by the processing server, communication of an immediate payment notification (IPN) for the authorized sub-transaction to the electronic transaction interface hosted by the interface server such that there is no indication of a successful execution of the transaction conveyed prior to authorization of each of the two or more sub-transactions.

2. The method of claim 1, further comprising:
receiving payment type selection used to indicate a payment type to be used in the execution of the multi-leg transaction;
wherein:
  an authorization process is based on the payment type selection, and
  the determining includes:
    generating a list of the two or more sub-transactions;
    inputting the portions of the transaction information into one or more authorization processes that ensure a buyer has sufficient funds to complete each of the two or more sub-transactions; and
    comparing the list of the two or more sub-transactions with a list of authorized sub-transactions.

3. The method of claim 2, wherein the authorization process includes one or more captures of portions of a price of the multi-leg transaction in response to the payment type selection including a credit card.

4. The method of claim 2, wherein the authorization process includes performing one or more risk assessments on the two or more sub-transactions in the coupled group in response to the payment type selection including use of an online money transfer system.

5. The method of claim 4, wherein:
the one or more risk assessments includes multiple risk assessments performed for each of the two or more sub-transactions, or
a single risk assessment on the two or more sub-transactions together.

6. The method of claim 2, wherein the authorization process includes verifying a gift card issue company a monetary value of a gift card in response to the payment type selection including a gift card icon.

7. The method of claim 1, further comprising:
following execution of the multi-leg transaction, receiving a refund request for one sub-transaction of the two or more sub-transactions; and
in response to the refund request, refunding a first amount exchanged for the one sub-transaction without refunding a second amount exchanged for another of the two or more sub-transactions.

8. One or more non-transitory computer-readable media storing one or more programs that are configured, in response to execution by one or more processors, to cause a system to execute or control execution of a method as recited in claim 1.

9. The method of claim 1, further comprising in response to authorization of each of the two or more sub-transactions, executing, by the processing server, the multi-leg transaction non-sequentially, wherein execution of the multi-leg transaction non-sequentially includes execution of each of the two or more sub-transactions simultaneously or substantially simultaneously.

10. A method of multi-leg transaction execution to reduce transaction execution failure, the method comprising:
responsive to placement of an item in an electronic transaction interface hosted by an interface server:
designating, by the interface server, a transaction including the item as a multi-leg transaction that includes two or more sub-transactions;
grouping, by the interface server, the two or more sub-transactions as a coupled group, wherein the two or more sub-transactions are configured to be executed sequentially and failure in execution of any one of the two or more sub-transactions prevents execution of remaining sub-transactions of the coupled group;
receiving, by the interface server, a transaction input used to indicate conditional execution of the transaction including the item, the transaction input being received responsive to selection of an icon on the electronic transaction interface;
in substantially real time and prior to execution of a pending multi-leg transaction that includes the two or more sub-transactions:
receiving, by the interface server, an application program interface (API) call communicated from a processing server, the API call being configured to call transaction information that includes transaction details of at least one of the two or more sub-transactions of the coupled group;
receiving, by the interface server, the transaction information for each of the two or more sub-transactions, the transaction information including selected payment types to be used in execution of the multi-leg transaction;
parsing, by the interface server, the transaction information for the selected payment types and one or more other portions of the transaction information;
determining, by the interface server, whether each of the two or more sub-transactions is authorized based at least partially on the parsed transaction information, the determining includes inputting the parsed transaction information into one or more authorization processes that ensure a buyer has sufficient funds to complete each of the two or more sub-transactions and includes a capture of a price of at least a part of the multi-leg transaction;
in response to a prior sub-transaction of the two or more sub-transaction being authorized and a subsequent sub-transaction of the two or more sub-transactions being unauthorized, delaying, by the interface server, communication of an immediate payment notification (IPN) for the authorized sub-transaction to the electronic transaction interface hosted by an interface server such that there is no indication of a successful execution of the transaction conveyed prior to authorization of each of the two or more sub-transactions, preventing execution of all of the two or more sub-transactions such that the multi-leg transaction is cancelled prior to execution of the authorized prior sub-transaction, and communicating a transaction failure message to a buyer device.

11. The method of claim 10, wherein the determining includes:
generating a list of the two or more sub-transactions;
further generating a list of authorized sub-transactions that includes each of the two or more sub-transactions that are authorized; and
comparing the list of the two or more sub-transactions with the list of authorized sub-transactions.

12. The method of claim 10, wherein the one or more authorization processes include one or both of:
performing one or more risk assessments on the two or more sub-transactions in the coupled group in response to the payment type selection including use of an online money transfer system; and
verifying a gift card issue company a monetary value of a gift card in response to the payment type selection including a gift card icon.

13. The method of claim 10, wherein the two or more sub-transactions of the coupled group include one or both of:
a first sub-transaction with a first vendor and a second sub-transaction at a second vendor; and
a product sub-transaction and an incidental sub-transaction that is related to the product sub-transaction.

14. The method of claim 10, wherein the transaction information includes one or more transaction information types selected from a group of transaction information including:
a type of incidental transaction;
a type of product;
a vendor identity;
a payment type;
a payment account;
a transaction identifier;
a buyer identity;
a third party or government entity identifier; and
a service fee for a service performed by a third party.

15. One or more non-transitory computer-readable media storing one or more programs that are configured, in response to execution by one or more processors, to cause a system to execute or control execution of a method as recited in claim 10.

16. The method of claim 10, further comprising non-sequentially executing the two or more sub-transactions and communicating a transaction notification to the buyer and to one or more vendor devices in response to each of the two or more sub-transactions being authorized, wherein the non-sequentially executing the two or more sub-transactions includes execution of each of the two or more sub-transactions simultaneously or substantially simultaneously.

17. A system configured to execute multi-leg transactions, the system comprising:
one or more processors;
a communication unit communicative coupled to the one or more processors; and
one or more computer-readable storage media communicatively coupled to the one or more processors and storing instructions that, in response to execution by the one or more processors, cause one or more components to perform operations comprising:
responsive to placement of an item in an electronic transaction interface hosted by an interface server:
designating a transaction including the item as a multi-leg transaction that includes two or more sub-transactions;
grouping the two or more sub-transactions as a coupled group, wherein the two or more sub-transactions are configured to be executed sequentially and failure in execution of any one of the two or more sub-transactions prevents execution of remaining sub-transactions of the coupled group;
receiving a transaction input used to indicate conditional execution of the transaction including the item, the transaction input being received responsive to selection of an icon on the electronic transaction interface;
in substantially real time and prior to execution of a pending multi-leg transaction that includes the two or more sub-transactions:
receiving, an application program interface (API) call communicated from a processing server, the API call being configured to call transaction information that includes transaction details of at least one of the two or more sub-transactions of the coupled group;
receiving the transaction information for each of the two or more sub-transactions, the transaction information including selected payment types to be used in execution of the multi-leg transaction;
parsing the transaction information for the selected payment types and one or more other portions of the transaction information;
determining whether each of the two or more sub-transactions is authorized based at least partially on the parsed transaction information, the determining includes inputting the parsed transaction information into one or more authorization processes that ensure a buyer has sufficient funds to complete each of the two or more sub-transactions and includes a capture of a price of at least a part of the multi-leg transaction;
in response to a prior sub-transaction of the two or more sub-transaction being authorized and a subsequent sub-transaction of the two or more sub-transactions being unauthorized, delaying communication of an immediate payment notification (IPN) for the authorized sub-transaction to the electronic transaction interface hosted by an interface server, preventing execution of all of the two or more sub-transactions such that the multi-leg transaction is cancelled prior to execution of the authorized prior sub-transaction; and communicating a transaction failure message to a buyer device; and
non-sequentially executing the two or more sub-transactions and communicating a transaction notification to the buyer and to one or more vendor devices in response to each of the two or more sub-transactions being authorized.

18. The system of claim 17, wherein the one or more authorization processes include one or both of:
performing one or more risk assessments on the two or more sub-transactions in the coupled group in response to the payment type selection including use of an online money transfer system; and
verifying a gift card issue company a monetary value of a gift card in response to the payment type selection including a gift card icon.

19. The system of claim 18, wherein:
the two or more sub-transactions of the coupled group include one or both of a first sub-transaction with a first vendor and a second sub-transaction at a second vendor, and a product sub-transaction and an incidental sub-transaction that is related to the product sub-transaction; and
the transaction information includes one or more transaction information types selected from a group of transaction information including:
a type of incidental transaction;
a type of product;
a vendor identity;
a payment type;
a transaction identifier;
a buyer identity;
a third party or government entity identifier; and
a service fee for a service performed by a third party.

20. The system of claim 17, wherein the non-sequentially executing the two or more sub-transactions includes execution of each of the two or more sub-transactions simultaneously or substantially simultaneously.

* * * * *